US011113175B1

(12) United States Patent
Adamo et al.

(10) Patent No.: US 11,113,175 B1
(45) Date of Patent: Sep. 7, 2021

(54) SYSTEM FOR DISCOVERING SEMANTIC RELATIONSHIPS IN COMPUTER PROGRAMS

(71) Applicant: The Ultimate Software Group, Inc., Weston, FL (US)

(72) Inventors: David Adamo, Sunrise, FL (US); John A. Maliani, Pembroke Pines, FL (US); Robert L. Vanderwall, Weston, FL (US); Michael L. Mattera, Coral Springs, FL (US); Dionny Santiago, Weston, FL (US); Brian R. Muras, Weston, FL (US); Keith A. Briggs, Coral Springs, FL (US); Tariq King, Pembroke Pines, FL (US)

(73) Assignee: THE ULTIMATE SOFTWARE GROUP, INC., Weston, FL (US)

( * ) Notice: Subject to any disclaimer, the term of this patent is extended or adjusted under 35 U.S.C. 154(b) by 0 days.

(21) Appl. No.: 15/994,851

(22) Filed: May 31, 2018

(51) Int. Cl.
*G06F 9/44* (2018.01)
*G06F 9/445* (2018.01)
(Continued)

(52) U.S. Cl.
CPC ........ *G06F 11/3608* (2013.01); *G06F 16/288* (2019.01); *G06F 40/30* (2020.01)

(58) Field of Classification Search
CPC .............. G06F 11/3608; G06F 16/288; G06F 17/2785; G06F 40/30
See application file for complete search history.

(56) References Cited

U.S. PATENT DOCUMENTS 5,045,994 A  9/1991 Belfer et al.
7,386,521 B2  6/2008 Adir et al.
(Continued)

FOREIGN PATENT DOCUMENTS

CN  101937438  6/2013
CN  102693183  4/2015
(Continued)

OTHER PUBLICATIONS

Dezhao Song, Building and Querying an Enterprise Knowledge Graph, 2017, pp. 356-368. https://ieeexplore.ieee.org/document/7947211 (Year: 2017).*

(Continued)

*Primary Examiner* — Mongbao Nguyen
(74) *Attorney, Agent, or Firm* — Akerman LLP; Mammen (Roy) P. Zachariah, Jr.

(57) ABSTRACT

A system for discovering semantic relationships in computer programs is disclosed. In particular, the system may synergistically identify and validate semantic relationships, concepts, and groupings associated with data elements within a static or dynamic, time varying, source input. The system may utilize feature extractors to extract features from the input and reasoners to develop associations using data from multiple feature set types, and, can thus generate reliable, robust, and complete sets of semantic relationships from the input. The system may generate hypotheses associated with the relationships, concepts, and groupings, and validate the hypotheses by testing an application under evaluation by the system and observing the outputs generated from the testing. Information pertaining to validated or invalidated hypotheses may be provided to a learning engine to maximize reasoning and performance in subsequent discovery processes by adjusting models, vocabularies, dictionaries, (Continued)

parameters utilized by the system in identifying the relationships, concepts, and groupings.

24 Claims, 10 Drawing Sheets

(51) Int. Cl.
*G06F 11/36* (2006.01)
*G06F 16/28* (2019.01)
*G06F 40/30* (2020.01)

(56) References Cited

U.S. PATENT DOCUMENTS

| | | |
|---|---|---|
| 7,428,700 B2 | 9/2008 | Wen et al. |
| 7,478,281 B2 | 1/2009 | Denniston |
| 7,599,831 B2 | 10/2009 | Ford |
| 7,694,181 B2 | 4/2010 | Noller et al. |
| 7,712,000 B2 | 5/2010 | Khoche et al. |
| 7,797,687 B2 | 9/2010 | Tillmann et al. |
| 7,849,425 B1 | 12/2010 | Hamid et al. |
| 7,895,148 B2 | 2/2011 | Ma et al. |
| 7,937,622 B2 | 5/2011 | Mehrotra |
| 7,958,495 B2 | 6/2011 | Kelso |
| 8,301,998 B2 | 10/2012 | Ruvini |
| 8,473,913 B2 | 6/2013 | Noller et al. |
| 8,479,164 B2 | 7/2013 | Becker et al. |
| 8,640,084 B2 | 1/2014 | Murthy |
| 8,683,442 B2 | 3/2014 | Peranandam et al. |
| 8,683,446 B2 | 3/2014 | Paradkar et al. |
| 9,116,725 B1 | 8/2015 | Baird |
| 9,223,669 B2 | 12/2015 | Lin |
| 9,536,522 B1 | 1/2017 | Hall et al. |
| 9,563,545 B2 | 2/2017 | Bennah et al. |
| 2004/0015846 A1 | 1/2004 | Haisraeli |
| 2005/0028077 A1 | 2/2005 | Wen et al. |
| 2006/0106798 A1 | 5/2006 | Wen et al. |
| 2007/0156720 A1 | 7/2007 | Maren |
| 2008/0275834 A1* | 11/2008 | Zhong ............... G06F 16/3344 706/46 |
| 2009/0083208 A1* | 3/2009 | Raghavan ............ G06F 19/324 706/47 |
| 2010/0064282 A1 | 3/2010 | Triou et al. |
| 2013/0074043 A1 | 3/2013 | Fu |
| 2015/0142418 A1* | 5/2015 | Byron ................. G06F 40/232 704/9 |
| 2015/0205782 A1 | 7/2015 | Subramanya et al. |
| 2016/0055077 A1 | 2/2016 | Baloch et al. |
| 2016/0055426 A1* | 2/2016 | Aminzadeh ........... G06N 7/005 706/12 |
| 2016/0179934 A1* | 6/2016 | Stubley .................. G06N 5/00 707/722 |
| 2016/0180217 A1* | 6/2016 | Boston ............. G06F 16/24578 706/46 |
| 2016/0180437 A1* | 6/2016 | Boston ............... G06Q 30/0631 705/26.7 |
| 2016/0180438 A1* | 6/2016 | Boston ................ G06F 40/10 705/26.7 |
| 2016/0182558 A1* | 6/2016 | Tripp ................... G06F 21/562 726/25 |
| 2016/0293034 A1* | 10/2016 | Agarwalla .............. G09B 7/06 |
| 2017/0010956 A1* | 1/2017 | Chen ..................... G06F 11/36 |
| 2017/0024311 A1 | 1/2017 | Andrejko et al. |
| 2018/0089381 A1* | 3/2018 | Allen .................... G16H 50/70 |
| 2018/0089568 A1* | 3/2018 | Allen .................... G16H 70/60 |
| 2018/0089572 A1* | 3/2018 | Aili ....................... G06F 40/30 |
| 2018/0121606 A1* | 5/2018 | Allen .................... G16H 50/20 |
| 2018/0203922 A1* | 7/2018 | Erpenbach .......... G06F 16/3334 |
| 2018/0218264 A1* | 8/2018 | Renders ................ G06N 5/006 |
| 2019/0065357 A1* | 2/2019 | Brafman ............. G06F 11/3692 |
| 2019/0188212 A1* | 6/2019 | Miller .................... G06N 7/005 |
| 2019/0190945 A1* | 6/2019 | Jang .................... H04L 63/1441 |
| 2019/0197431 A1* | 6/2019 | Gopalakrishnan .... G06F 16/904 |
| 2019/0237068 A1* | 8/2019 | Canim ................. G06F 16/219 |
| 2019/0354876 A1* | 11/2019 | Cohen ..................... G06N 5/02 |
| 2020/0089677 A1* | 3/2020 | Bagchi ................ G06F 40/169 |

FOREIGN PATENT DOCUMENTS

| | | |
|---|---|---|
| CN | 104516818 | 4/2015 |
| WO | 2005059744 | 6/2005 |
| WO | 2016004657 | 1/2016 |

OTHER PUBLICATIONS

Ilknur Celik, Learning Semantic Relationships between Entities in Twitter, 2010, pp. 1-15. https://link.springer.com/chapter/10.1007/978-3-642-22233-7_12 (Year: 2010).*

Spiros Nikolopoulos, Evidence-Driven Image Interpretation by Combining Implicit and Explicit Knowledge in a Bayesian Network, 2011, pp. 1366-1379. https://ieeexplore.ieee.org/document/5783308 (Year: 2011).*

Mohammad Naghshvar, Active sequential hypothesis testing, 2013, pp. 2703-2737. https://www.projecteuclid.org/journals/annals-of-statistics/volume-41/issue-6/Active-sequential-hypothesis-testing/10.1214/13-AOS1144.full (Year: 2013).*

Roberta Akemi Sinoara, Text mining and semantics: a systematic mapping study, 2017, pp. 1-20. https://journal-bcs.springeropen.com/track/pdf/10.1186/s13173-017-0058-7.pdf (Year: 2017).*

Kephart et al. "The vision of autonomic computing," Computer 36.1, 2003, pp. 41-50. http://130.18.208.80/~ramkumar/acvision.pdf.

Appavoo et al., "Enabling autonomic behavior in systems software with hot swapping." IBM systems journal 42.1, 2003, pp. 60-76. https://pdfs.semanticscholar.org/ee1b/c723187317a3bebd0af01d218e51b818b16b.pdf.

Petke et al., "Genetic Improvement of Software: a Comprehensive Survey," IEEE Transactions on Evolutionary Computation, vol. PP, Issue: 99, pp. 1-1, Apr. 25, 2017, Print ISSN: 1089-778X, Electronic ISSN: 1941-0026, DOI: 10.1109/TEVC.2017.2693219, http://ieeexplore.ieee.org/stamp/stamp.jsp?arnumber=7911210.

Kelong et al., "Implementation of automated testing system for android applications based on dynamic taint propagation," 2014 Communications Security Conference, pp. 1-5, DOI: 10.1049/cp.2014.0736, Referenced in: Cited by: Papers (1) IET Conference Publications. http://ieeexplore.ieee.org/stamp/stamp.jsp?tp=&arnumber=6992229.

Sterritt et al., "Autonomic Computing—a means of achieving dependability?." Engineering of Computer-Based Systems, 10th IEEE International Conference and Workshop on the IEEE, 2003.

Truszkowski et al., "The Challenge of Building Autonomous Software." IT Professional, vol. 6, Sep.-Oct. 2004, pp. 47-52, published Nov. 30, 2004, IISSN: 1520-9202, INSPEC Accession No. 8202596 DOI: 10.1109/MITP.2004.66.

* cited by examiner

600

*Not a valid email address (12)

Name:                                                           (Tutorial) (13)

_____(1)    _____    _____
First                  Middle               Last
_____(2)
Preferred nickname Home address: (3) _____
_____(4)_____
Post office boxes will not be accepted. (5)

Phone Number: (6) ( ) ___(9)___-_____ (input numbers only)(8)
[country code: area code: local number] (7)

email address: (10)▓▓▓▓▓▓▓▓▓▓▓▓▓▓▓▓
                        (Submit) (11)

| Component | Name | Number ranges | Notes |
|---|---|---|---|
| NPA | Numbering Plan Area Code | Allowed ranges: [2–9] for the first digit, and [0-9] for the second and third digits. When the second and third digits of an area code are the same, that code is called an easily recognizable code (ERC). ERCs designate special services; e.g., 888 for toll-free service. The NANP is not assigning area codes with 9 as the second digit. | Covers Canada, the United States, parts of the Caribbean Sea, and some Atlantic and Pacific islands. The area code is often enclosed in parentheses. |
| NXX | Central Office (exchange) code | Allowed ranges: [2–9] for the first digit, and [0–9] for both the second and third digits (however, in geographic area codes the third digit of the exchange cannot be 1 if the second digit is also 1). | Often considered part of a subscriber number. The three-digit Central Office codes are assigned to a specific CO serving its customers, but may be physically dispersed by redirection, or forwarding to mobile operators and other services. |
| xxxx | Subscriber Number | [0–9] for each of the four digits. | This unique four-digit number is the subscriber number or station code. |

FIG. 8

SYSTEM FOR DISCOVERING SEMANTIC RELATIONSHIPS IN COMPUTER PROGRAMS

CROSS-REFERENCE TO RELATED APPLICATIONS

The present application is related to U.S. patent application Ser. No. 15/905,362, filed on Feb. 26, 2018, which is hereby incorporated by reference in its entirety. The present application is also related to U.S. patent application Ser. No. 15/994,910, filed on May 31, 2018, title "System for Understanding Navigational Semantics via Hypothesis Generation and Contextual Analysis"; U.S. patent application Ser. No. 15/994,984, filed on May 31, 2018, title "System for Optimizing System Resources and Runtime During a Testing Procedure"; U.S. patent application Ser. No. 15/994,869, filed on May 31, 2018, title "System for Providing Intelligent Part of Speech Processing of Complex Natural Language"; and U.S. patent application Ser. No. 15/994,845, filed on May 31, 2018, title "System for Providing Autonomous Discovery of Field or Navigation Constraints," all of which are hereby incorporated by reference in the present disclosure in their entireties.

FIELD OF THE INVENTION

The present application relates to computing technologies, natural language processing technologies, machine learning technologies, testing technologies, hypothesis testing technologies, constraint determination technologies, software evaluation technologies, software optimization technologies, and more particularly, to a system and method for discovering semantic relationships in computer programs.

BACKGROUND

In today's technologically-driven society, users and businesses are increasingly relying on software application and computing systems for facilitating and providing various types of services. As the reliance and dependence on software applications and computing systems has increased, so has the need to provide rapid and accurate updates to software applications and computing systems that are tailored to users' and businesses' ever evolving needs. In order to ensure that rapid and accurate updates to software applications and computing systems are provided, efficient and effective testing of such software applications and computing systems should be performed to ensure that users and businesses experience minimal errors, minimal inaccuracies, and/or optimized functionality when interacting with such software applications and computing systems. To that end, in order to test, exercise, and/or navigate through a software application, it is often desirable to model an application such that a system can perform automatic test, improved search, path finding, code generation, automatic help or training media production, etc., as discussed in U.S. patent application Ser. No. 15/905,362, filed on Feb. 26, 2018, In order to model the application it is useful to understand the semantic relationships between information provided to a user through displayed visuals, audio, haptic output, textual information, multidimensional models, multimedia displays, and/or any other communication mechanism.

Currently existing systems may be able to develop semantic data associations by examining the stored, transmitted, or otherwise observed structure within source code, web sites, electronic documents, forms, screens or other structured data sources. However, these existing systems cannot effectively or efficiently draw connections between information whose associations cannot be directly derived from the source information's inherent structure. In practice, such systems, which primarily rely on the structure of the source information, produce relationships that are often sparse, noisy and error prone. Other present systems can visually develop data associations by examining the rendered structure of web sites, electronic documents, forms, screens, or pages. These systems may look to the proximity of displayed objects and attempt to hierarchically segment displayed information by utilizing visual separators within the displayed data. While such systems have shown considerable success in generally segmenting much web-site data, these systems are not able to resolve the nature of the data relationships unless the data is organized within a clearly defined visual hierarchy. Notably, these systems cannot resolve data lacking clear visual associations nor can they resolve visually ambiguous data relationships. Furthermore, these systems cannot resolve time or action sensitive relationships within a temporally changing view.

Other existing systems may develop relationships through an examination of stored, transmitted, or displayed textual information, or audio information, which can be converted to text. These systems may track the words used within a document and the relational combination of words, phrases, sentences, paragraphs, and sections within full documents. These systems have limited or no capability to relate information of different types (e.g., image and textual data), or information which is not clearly related within the organizational structure of the document. Existing systems may look to a single domain of information, e.g. structural, rendered, textual content, etc., to establish semantic relationships between the elements of an application. Currently existing systems cannot effectively and reliably relate information across disparate data types such as video, audio and text, nor can they effectively and reliably develop relationships based on the time-changing nature of displayed, transmitted or stored information. Despite the limitations of present day systems to automatically, accurately and completely understand the relationships between data displayed by computer programs (or other communication mechanism of a computer program), this relationship data is of primary importance where available. Current search systems utilize available relationship data to filter out less relevant information and to improve the quality of search results.

As a result, current testing technologies and processes may be modified and improved so as to provide enhanced functionality and features. Such enhancements and improvements may effectively decrease the effort required to determine concepts, relationship, and/or groupings associated with data elements present in various sources of information, while simultaneously improving the accuracy of such determinations. Additionally, such enhancements and improvements may provide for increased application navigation capabilities, increased testing capabilities, increased learning capabilities, increased autonomy, improved interactions with users or devices, improved user satisfaction, increased efficiencies, increased access to meaningful data, substantially-improved decision-making abilities, and increased ease-of-use. Furthermore, such enhancements and improvements may reduce processor, memory, and network bandwidth usage. Moreover, such enhancements and improvements may increase a testing system's ability to test software applications more efficiently and effectively.

SUMMARY

A system and accompanying methods for discovering semantic relationships in computer programs are disclosed. To understand the functionality of a computer program to automatically test, exercise, navigate or search the computer program, it is beneficial to develop an interconnected representation of the actions taken, the information displayed, or the audio played by the computer program. Understanding the data relationships between the various input and output sources of a computer program is important to the automatic and intelligent search, navigation, exercise, and testing of computer programs. Effective navigation requires that constraints on field entries and order of operations be fully understood; however, to reach this understanding it is desirable to identify the linkages between constraint information and the field or fields to which a given constraint applies. Furthermore, to search or test a computer program, it is important to understand the concepts, relationships and grouping of elements within and between inputs and outputs. To that end, the system and accompanying methods may intelligently and efficiently identify concepts, relationships, and groupings between data elements within a static or dynamic data source through a variety of ways. For example, the system and accompanying methods may identify such concepts, relationships, and/or groupings by intelligently reasoning about one or more organizational and/or geometrical input sources and one or more language input sources to generate concept, relationship, and grouping hypotheses, using supervised learning techniques to train reasoners utilized by the system and methods, verifying generated hypotheses using an active hypothesis tester, continually improving algorithmic or learned confidence thresholds, reasoner models, parameters, and data dictionaries from actively confirmed/rejected hypotheses, and optimizing the selection of features extracted and reasoners utilized to minimize or maximize a weighted function of cost, quality, and performance parameters for the system through the use of intelligent feature selection.

Currently disclosed approaches may examine an individual static source and identify related semantic concepts using a limited feature set extracted with a single technique. The limited features utilized by these systems to develop semantic relationships limit their accuracy and utility. These presently disclosed systems do not utilize features extracted using multiple, non-correlated, diverse techniques, and consequently, the results generated from current approaches often produce noisy, inaccurate data. The system and methods utilize reasoners which develop associations using data from multiple feature set types, and can thus generate more reliable, robust and complete set of semantic relationships from the input source data. The system and methods use of organizational and/or geometrical input sources with language input sources improves upon existing systems and allows for the identification of a greater number of concepts, relationships, and groups between and within the data sources. Cross component reasoning employed by the system and methods across sources and information types further improves the quality and accuracy of the hypothesized concepts, relationships, and groupings. In certain embodiments, the system and methods utilize a hypothesis resolver and/or tester to further improve the quality of output concepts, relationships, and groupings while providing feedback to a learning engine. The system and methods further utilize a training engine that allows for the supervised generation of initial machine learning semantic relationship reasoning models and a dynamic learning engine that may support the continuous modification of reasoning models and parameters based upon tested and resolved reasoning hypotheses.

In certain embodiments, the system and accompanying methods may be utilized to utilize data and textual information obtained from outputs of a software application, internal documents, external documents, hierarchical and/or graphical models, other information sources, or a combination thereof, to determine or infer the proper constraints across complex parameters and/or across related parameter fields to allow for the successful navigation, exercise, and/or testing of the software application. Additionally, the system and methods provide for state, transition, and/or constraint exploration based upon continuous generation, execution, and analysis of semantic hypotheses based on likely semantic suggestions from integrated knowledge sources. In certain embodiments, the system and methods provide for the state and/or transition constraint exploration based upon the natural language context of associated labels and correlated internal and/or external document sources. In order to accomplish the foregoing, the system and methods may correlate labels, help text, menus, error messages, audio alerts, visual alerts (e.g. red font, bold font, highlighted font or highlighted background, tec.), multimedia training materials, and other information, which may be displayed by the software application with the field (e.g. input field), order of operations, and/or transition constraints of interest associated with a software application. Additionally, the system and methods may correlate information from one or more internal and/or external document sources with the field, the order of operations, and/or transition constraints of interest associated with the software application.

Based on the correlations, the system and methods may include performing natural language processing on textual information extracted from the correlated application data and associated internal and/or external document information to generate one or more suggested constraints for the field, the order of operations, and/or the transitions of the software application. In certain embodiments, the suggested constraints may include a confidence value, which may be based on a variety of factors. In certain embodiments, the confidence value may be based on the strength of the correlation or association between the processed information and the field, order of operations, and/or transitions of the software application, the quality of the natural language processing of the textual and contextual information, the source of the textual information (e.g. the system may trust one source (e.g. an internal API document) over another source (an online source or Internet document) and thus having a higher confidence value for the API document source), the number of reinforcing and/or conflicting sources of constraint information, the complexity of the constraint, a history of a constraint, metadata associated with a constraint (e.g. metadata describing how often the constraint fails or passes, how often the constraint is used, confidence levels/scores for the constraint, ranking of the constraint relative to other constraints, etc.), any other factor, or a combination thereof. In certain embodiments, the suggested constraints may include, but are not limited to, types of values for fields and/or parameters of the software application (e.g. an input field is a dollar-denominated field), appropriate default values for the fields and/or parameters (e.g. a zero dollar value may be assumed for an input field), appropriate formatting settings for the values for the fields and/or parameters (e.g. the values are real numbers to two decimal points of precision), appropriate constraints on the fields and/or values (e.g. values must be between 0.00 and 100.00), the order in which operations should be performed in the software application (e.g. which input fields of the software application are to be filled and in what precise order), which fields are required or optional, any other type of constraint-related information, or a combination thereof. In certain embodiments, the system 100 and methods may include merging or combining constraints if the information extracted from the various sources of information indicate that the constraints are compatible, related to each other, depend on one another, or a combination thereof, to improve the confidence value, to simplify and combine constraints, or to generate complex or relational constraints (e.g. a relational constraint having a requirement that a first input field have a value that is less than the value contained in a second input field). In certain embodiments, the system 100 and methods may include simplifying merged and/or combined constraints and/or creating generalized constraints. In certain embodiments, the system 100 and methods may include detecting, based on analyzing the information provided by the various information sources, potential and/or actual defects in suggested constraints or conflicts between suggested constraints, desired constraints, or a combination thereof.

The system and methods may also include conducting hypothesis testing to increase the initial confidence value provided for the suggested constraint. In certain embodiments, the resulting increased confidence value may be utilized according to the system 100 and methods to keep or discard the suggested constraint, or prioritize the suggested constraint over other constraints (or prioritize lower than another constraint)—either existing or suggested. The system and methods may utilize a learning engine to assist in refining confidence values for suggested constraints over time as new information is obtained from information sources, as new information is obtained from the results of natural language processing of textual information received from the information sources, and/or new information is received from the software application being tested itself. In certain embodiments, the learning engine of the system may identify and flag a data source or a collection of data sources, for which the constraint hypotheses tests generated from the data source or collection of data sources have failed. The learning engine may keep a history of the results of hypothesis tests, and over time be able to learn which learning sources were the most accurate. Therefore, the learning engine may prefer the more accurate source if it ever needs to decide between two constraints, or if there are limited system resources, it may only use constraints from the accurate source, and not waste system resources with the less accurate source. In certain embodiments, the suggested constraints and/or related confidence values may be utilized to represent the software application being evaluated. In such embodiments, the constraint information may be utilized to successfully navigate or exercise the software application being evaluated. In another embodiment, the system and methods may include utilizing the constraints and/or related confidences to represent the desired or even intended functionality of the software application. In such an embodiment, the system and method may utilize the constraint information to support the autonomous testing of the software application being evaluated.

In certain embodiments, a softmatch method or function may be employed to correlate a potential constraint source with a target field of the application under evaluation, an order of operations of the application under evaluation, a transition of the application under evaluation, or a combination thereof. In certain embodiments, the softmatch method or function generates correlations, i.e. matches, where there may be some degree of uncertainty as to the correlation strength between the source and the target. In certain embodiments, the softmatch result may be computed from the application of one or more correlation similarity methods and may incorporate multiple pieces of data, text, concepts or constraints from the source or the target. In some embodiments, the softmatch may also utilize machine learning techniques to learn what constitutes high or low confidence matches over time, utilizing supervised learning results and/or the dynamically generated results of constraint hypothesis testing. In some embodiments, the confidences generated by the softmatch results, which constitute a match may return a normalized confidence value less than 1.0, where normalized match confidences values may range between 0.0 and 1.0). Where an explicit hard link between a constraint and a target field often requires manual generation, and where a hard link is often brittle, i.e. breaks under minor changes to the application under evaluation or its related documents, the softmatch may provide for the autonomous generation of correlations reflective of the present state of the application under evaluation 230 and related documents. Besides confidence, in some embodiments, the softmatch may be composed by having at least two similarity confidences computed. For example, a proximity check may determine that a source and target may be correlated based on their proximity to each other within the application under evaluation 230. Additionally, a comparison of parsed text extracted from the source data and target data may result in a natural language processing similarity score indicative of a correlation between the textual content of the source and target. In an embodiment of the system 100, the softmatch may merge two or more individually determined correlations into a combined score. In different embodiments, the combined score may be generated as an average, a weighted average, a min or max of the contributors, the score resulting from the most trusted source, a machine learned weighting, a normalized linear combination, a normalized non-linear combination, another method, or any combination thereof.

In one embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target, which extracted data may also include data extracted from semantically related elements of the application under evaluation or existing correlation data, and where target data may include target data, target text parsed from target data, target concept(s), and existing constraint(s) extracted from target text using at least one natural language processing technique. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly. In certain embodiments, the associating may further include merging or combining a source constraint and a preexisting constraint from the target.

In one embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target. The extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly.

In another embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target. The extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly. Moreover, the system may include conducting hypothesis testing on the suggested constraint to increase a confidence value of the suggested constraint to a greater confidence value.

In another embodiment, the system may identify a source from an output of an application under evaluation by the system, from documents internal to the system, documents external to the system, or a combination thereof. In a further embodiment, the system may iteratively or recursively, serially or in parallel, identify multiple sources from an output of an application under evaluation by the system, from documents internal to the system, documents external to the system, or a combination thereof. Similarly, in a further embodiment, the system may iteratively or recursively, serially or in parallel, identify multiple targets as a field of the application under evaluation, an order of operations of the application under evaluation, a transition of the application under evaluation, or a combination thereof. In such embodiments where multiple sources and/or targets are identified, an embodiment of the system may, serially or in parallel, iteratively or recursively, generate constraints, associate the constraints with targets, and assign confidence values to the constraints. In a further embodiment, a system may perform a screening filter using a subset of source data and/or a subset of target data, to generate a subset of high value source and constraint target pairings, using an operationally more efficient correlation screening method to reduce processing, network, memory or other performance loads. In such an embodiment, the system may calculate constraints and associated confidence values, and associate constraints to targets, only for those source and target pairs which pass the application of the screening filter.

In one embodiment, a system for discovering semantic relationships in computer programs is disclosed. The system may include a memory that stores instructions and a processor that executes the instructions to perform operations conducted by the system. The system may perform an operation that includes analyzing information provided by a source. In certain embodiments, the information may be associated with an application under evaluation by the system. Based on the analyzing of the information provided by the source, the system may perform an operation that includes determining a concept associated with data elements in the information, a relationship between the data elements in the information, a grouping associated with the data elements in the information, or a combination thereof. The system may proceed to perform an operation that includes generating a hypothesis associated with the concept, the relationship, the grouping, or a combination thereof. In certain embodiments, the hypothesis may be ranked relative to other hypotheses generated by the system based on a confidence level of the hypothesis and confidence levels of the other hypotheses to form a ranked plurality of hypotheses. Additionally, the system may perform an operation that includes filtering, by applying a confidence level threshold to the ranked plurality of hypotheses, a subset of hypotheses from the ranked plurality of hypotheses satisfying the confidence level threshold. Furthermore, the system may perform an operation that includes outputting the subset of hypotheses satisfying the confidence level threshold for use by the system, by other entities, and/or by users.

In another embodiment, a method for discovering semantic relationships in computer programs is disclosed. The method may include utilizing a memory that stores instructions, and a processor that executes the instructions to perform the various functions of the method. In particular, the method may include analyzing information provided by a source. In certain embodiments, the information may be associated with an application under evaluation by a system. The method may then include determining, based on the analyzing of the information provided by the source, a concept associated with data elements in the information, a relationship between the data elements in the information, a grouping associated with the data elements in the information, or a combination thereof. The method may also include generating a hypothesis associated with the concept, the relationship, the grouping, or a combination thereof. In certain embodiments, the method may include ranking the hypothesis relative to other hypotheses generated by the system based on a confidence level of the hypothesis and confidence levels of the other hypotheses to form a ranked plurality of hypotheses. The method may then include filtering, by applying a confidence level threshold to the ranked plurality of hypotheses, a subset of hypotheses from the ranked plurality of hypotheses that satisfy the confidence level threshold. The method may further include validating the hypothesis, the other hypotheses, the subset of hypotheses, or a combination thereof, by testing the application under evaluation and observing outputs generated based on the testing.

According to yet another embodiment, a computer-readable device, such as a non-transitory computer-readable device, having instructions stored thereon for discovering semantic relationships in computer programs is provided. The computer instructions, which when loaded and executed by a processor, may cause the processor to perform operations including: analyzing information provided by a source, wherein the information is associated with an application under evaluation by the system; determining, based on the analyzing of the information provided by the source, a concept associated with data elements in the information, a relationship between the data elements in the information, a grouping associated with the data elements in the information, or a combination thereof; generating a hypothesis associated with the concept, the relationship, the grouping, or a combination thereof, wherein the hypothesis is ranked relative to other hypotheses generated by the system based on a confidence level of the hypothesis and confidence levels of the other hypotheses to form a ranked plurality of hypotheses; filtering, by applying a confidence level threshold to the ranked plurality of hypotheses, a subset of hypotheses from the ranked plurality of hypotheses satisfying the confidence level threshold; and utilizing the subset of hypotheses filtered from the ranked plurality of hypothesis when testing the application under evaluation.

These and other features of the systems and methods discovering semantic relationships in computer programs are described in the following detailed description, drawings, and appended claims.

BRIEF DESCRIPTION OF THE DRAWINGS

FIG. 6 is an example of a computer program input form associated with an application under evaluation that may be analyzed by the system of FIG. 1 to determine semantic relationships between and among the various data elements within the form.

FIG. 8 is a table illustrating phone number formats for phone numbers, which have been determined by a domain reasoner of the system of FIG. 1.

DETAILED DESCRIPTION OF THE INVENTION

Figure 1:
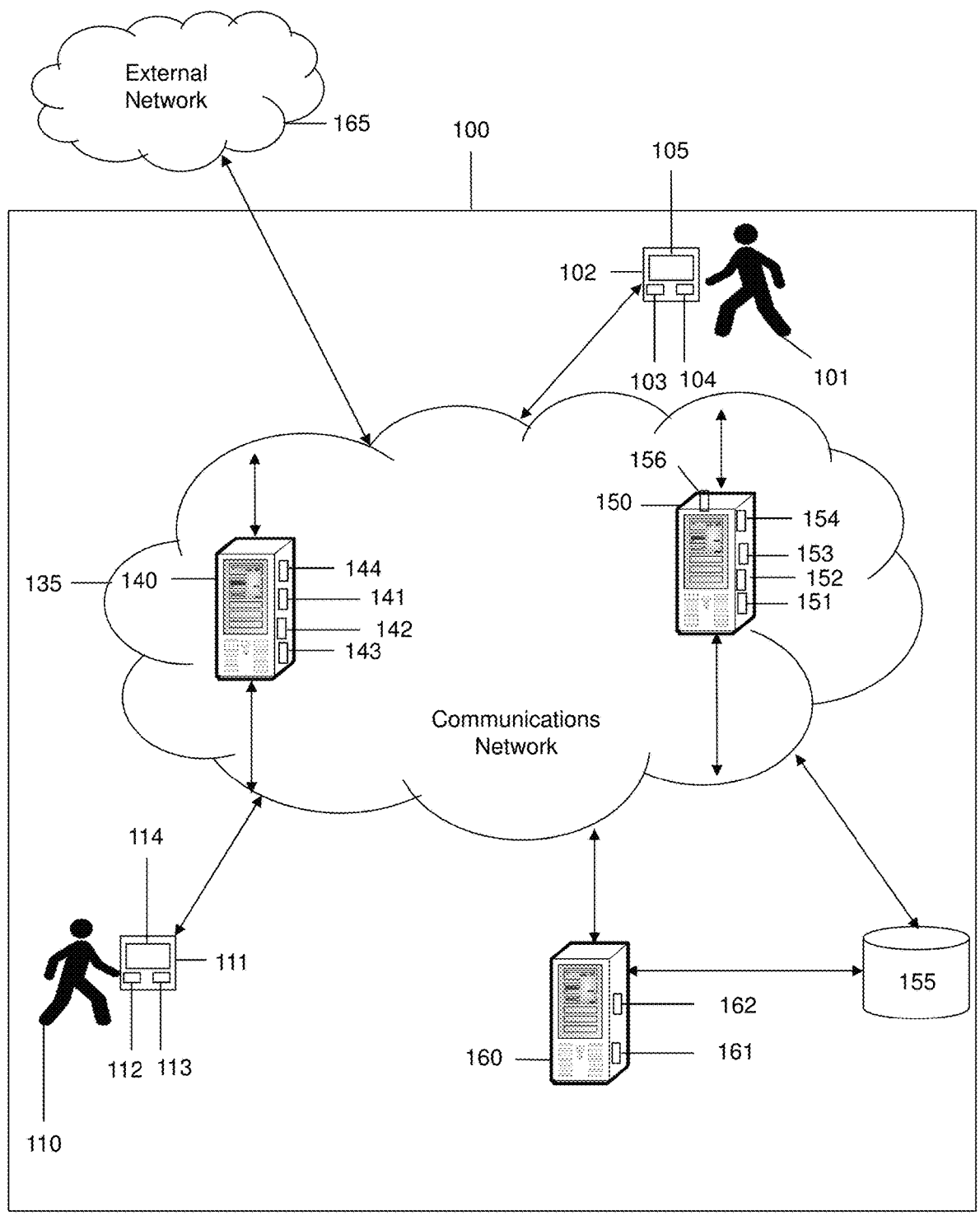
FIG. 1 is a schematic diagram of a system for discovering semantic relationships in computer programs according to an embodiment of the present disclosure.

A system 100 and accompanying methods for discovering semantic relationships in computer programs are disclosed. To that end, the system 100 and accompanying methods may intelligently and efficiently identify concepts, relationships, and groupings between data elements within a static or dynamic data source through a variety of ways. For example, the system 100 and accompanying methods may identify such concepts, relationships, and/or groupings by intelligently reasoning about one or more organizational and/or geometrical input sources and one or more language input sources to generate concept, relationship, and grouping hypotheses, using supervised learning techniques to train reasoners utilized by the system and methods, verifying generated hypotheses using an active hypothesis tester, continually improving algorithmic or learned confidence thresholds, reasoner models, parameters, and data dictionaries from actively confirmed/rejected hypotheses and/or constraints, and optimizing the selection of features extracted and reasoners utilized to minimize or maximize a weighted function of cost, quality, and performance parameters for the system through the use of intelligent feature selection.

As discussed above, currently disclosed approaches may examine an individual static source and identify related semantic concepts using a limited feature set extracted with a single technique. The limited features utilized by these systems to develop semantic relationships limit their accuracy and utility. These presently disclosed systems do not utilize features extracted using multiple, non-correlated, diverse techniques, and consequently, the results generated from current approaches often produce noisy, inaccurate data. The system 100 and methods utilize reasoners 22 which develop associations using data from multiple feature set types, and can thus generate more reliable, robust and complete set of semantic relationships from the input source data. The system 100 and methods use of organizational and/or geometrical input sources with language input sources improves upon existing systems and allows for the identification of a greater number of concepts, relationships, and groups between and within the data sources. Cross component reasoning employed by the system 100 and methods across sources and information types further improves the quality and accuracy of the hypothesized concepts, relationships, and groupings. In certain embodiments, the system 100 and methods utilize a hypothesis resolver 157 and/or tester 154 to further improve the quality of output concepts, relationships, and groupings while providing feedback to a learning engine. The system 100 and methods further utilize a training engine 175 that allows for the supervised and/or unsupervised generation of initial machine learning semantic relationship reasoning models and a dynamic learning engine 226 that may support the continuous modification of reasoning models and parameters based upon tested and resolved reasoning hypotheses.

In certain embodiments, the system and accompanying methods may be utilized to utilize data and textual information obtained from outputs of a software application, internal documents, external documents, hierarchical and/or graphical models, other information sources, or a combination thereof, to determine or infer the proper constraints across complex parameters and/or across related parameter fields to allow for the successful navigation, exercise, and/or testing of the software application. Additionally, the system and methods provide for state, transitions, and/or constraint exploration based upon continuous generation, execution, and analysis of semantic hypotheses based on likely semantic suggestions from integrated knowledge sources. In certain embodiments, the system and methods provide for the state and/or transition constraint exploration based upon the natural language context of associated labels and correlated internal and/or external document sources. In order to accomplish the foregoing, the system and methods may correlate labels, help text, menus, error messages, audio alerts, visual alerts (e.g. red font, bold font, highlighted font or highlighted background, tec.), multimedia training materials, and other information, which may be displayed by the software application with the field, order of operations, and/or transition constraints of interest associated with a software application. Additionally, the system and methods may correlate information from one or more internal and/or external document sources with the field, the order of operations, and/or transition constraints of interest associated with the software application.

Based on the correlations, the system and methods may include performing natural language processing on textual information extracted from the correlated application data and associated internal and/or external document information to generate one or more suggested constraints for the field, the order of operations, and/or the transitions of the software application. In certain embodiments, the suggested constraints may include a confidence value, which may be based on a variety of factors. In certain embodiments, the confidence value may be based on the strength of the correlation or association between the processed information and the field, order of operations, and/or transitions of the software application, the quality of the natural language processing of the textual and contextual information, the source of the textual information (e.g. the system may trust one source (e.g. an internal API document) over another source (an online source or Internet document) and thus having a higher confidence value for the API document source), the number of reinforcing and/or conflicting sources of constraint information, the complexity of the constraint, a history of the constraint, metadata associated with the constraint, any other factor, or a combination thereof. In certain embodiments, the suggested constraints may include, but are not limited to, types of values for fields and/or parameters of the software application (e.g. the input field is a dollar-denominated field), appropriate default values for the fields and/or parameters (e.g. a zero dollar value may be assumed for an input field), appropriate formatting settings for the values for the fields and/or parameters (e.g. the values are real numbers to two decimal points of precision), appropriate constraints on the fields and/or values (e.g. values must be between 0.00 and 100.00), the order in which operations should be performed in the software application (e.g. which input fields of the software application are to be filled and in what precise order), which fields are required or optional, any other type of constraint-related information, or a combination thereof. In certain embodiments, the system 100 and methods may include merging or combining constraints if the information extracted from the various sources of information indicate that the constraints are compatible, related to each other, depend on one another, or a combination thereof, to improve the confidence value, to simplify and combine constraint, or to generate complex or relational constraints (e.g. a relational constraint having a requirement that a first input field have a value that is less than the value contained in a second input field). In certain embodiments, the system 100 and methods may include simplifying merged and/or combined constraints and/or generalizing constraints. In certain embodiments, the system 100 and methods may include detecting, based on analyzing the information provided by the various information sources, potential and/or actual defects in suggested constraints or conflicts between suggested constraints, desired constraints, or a combination thereof.

The system and methods may also include conducting hypothesis testing to increase the initial confidence value provided for the suggested constraint. In certain embodiments, the resulting increased confidence value may be utilized according to the system 100 and methods to keep or discard the suggested constraint, or prioritize the suggested constraint over other constraints (or prioritize lower than another constraint)—either existing or suggested. The system and methods may utilize a learning engine to assist in refining confidence values for suggested constraints over time as new information is obtained from information sources, as new information is obtained from the results of natural language processing of textual information received from the information sources, and/or new information is received from the software application being tested itself. In certain embodiments, the learning engine of the system may identify and flag a data source or a collection of data sources, for which the constraint hypotheses tests generated from the data source or collection of data sources have failed. The learning engine may keep a history of the results of hypothesis tests, and over time be able to learn which learning sources were the most accurate. Therefore, the learning engine may prefer the more accurate source if it ever needs to decide between two constraints, or if there are limited system resources, it may only use constraints from the accurate source, and not waste system resources with the less accurate source. In certain embodiments, the suggested constraints and/or related confidence values may be utilized to represent the software application being evaluated. In such embodiments, the constraint information may be utilized to successfully navigate or exercise the software application being evaluated. In another embodiment, the system and methods may include utilizing the constraints and/or related confidences to represent the desired or even intended functionality of the software application. In such an embodiment, the system and method may utilize the constraint information to support the autonomous testing of the software application being evaluated.

In certain embodiments, a softmatch method or function may be employed to correlate a potential constraint source with a target field of the application under evaluation, an order of operations of the application under evaluation, a transition of the application under evaluation, or a combination thereof. In certain embodiments, the softmatch method or function generates correlations, i.e. matches, where there may be some degree of uncertainty as to the correlation strength between the source and the target. In certain embodiments, the softmatch result may be computed from the application of one or more correlation similarity methods and may incorporate multiple pieces of data, text, concepts or constraints from the source or the target. In some embodiments, the softmatch may also utilize machine learning techniques to learn what constitutes high or low confidence matches over time, utilizing supervised learning results and/or the dynamically generated results of constraint hypothesis testing. In some embodiments, the confidences generated by the softmatch results, which constitute a match may return a normalized confidence value less than 1.0, where normalized match confidences values may range between 0.0 and 1.0). Where an explicit hard link between a constraint and a target field often requires manual generation, and where a hard link is often brittle, i.e. breaks under minor changes to the application under evaluation or its related documents, the softmatch may provide for the autonomous generation of correlations reflective of the present state of the application under evaluation 230 and related documents. Besides confidence, in some embodiments, the softmatch may be composed by having at least two similarity confidences computed. For example, a proximity check may determine that a source and target may be correlated based on their proximity to each other within the application under evaluation 230. Additionally, a comparison of parsed text extracted from the source data and target data may result in a natural language processing similarity score indicative of a correlation between the textual content of the source and target. In an embodiment of the system 100, the softmatch may merge two or more individually determined correlations into a combined score. In different embodiments, the combined score may be generated as an average, a weighted average, a min or max of the contributors, the score resulting from the most trusted source, a machine learned weighting, a normalized linear combination, a normalized non-linear combination, another method, or any combination thereof. Notably, such enhancements and features reduce processor, memory, and network resource usage. Moreover, such enhancements and improvements more efficiently and effectively determine the proper constraints across various parameters and the proper hypotheses and tests to allow for the successful navigation, exercise, and/or testing of the software application when compared to existing testing systems.

As shown in FIGS. 1-10, a system 100 and method 900 for discovering semantic relationships in computer programs are disclosed. Notably, the system 100 may also be utilized to autonomously test a computing system as is described in further detail in U.S. patent application Ser. No. 15/905,362, filed on Feb. 26, 2018, which is incorporated by reference in its entirety. The system 100 may be configured to support, but is not limited to supporting, natural language processing services, machine learning services, data and content services, artificial intelligence services, computing applications and services, cloud computing services, internet services, satellite services, telephone services, software as a service (SaaS) applications and services, computing testing services, software testing services, hardware testing services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be a user that may want to discover semantic relationships, concepts, and/or groupings associated with data elements in one or more sources of information, and may want to determine which hypotheses associated with the semantic relationships, concepts and/or groupings satisfy confidence thresholds and are validated by testing against an application under evaluation 230. In certain embodiments, the first user 101 may be any type of user that may desire to have content, such as text or other content, to be parsed by a natural language processing system, such as natural language processing engine 143, and to determine constraints for fields of an application, constraints relating to an order of operations to be conducted by the application, and/or constraints for transitions occurring in the application (e.g. from one state of the application to another state). Additionally, the first user 101 may desire to have hypotheses associated with the constraints generated by the system 100 and/or tests for testing the hypotheses generated by the system 100 so that the constraints and/or hypotheses may be validated. In certain other embodiments, the first user 101 may be any type of user that may potentially desire to test one or more software applications created by the first user 101, created for the first user 101, under the control of the first user 101, being modified by the first user 101, associated with the first user 101, or any combination thereof. For example, the first user 101 may have created a software application that has functional features that manage, modify, and store human resource information for employees of a business. Of course, the system 100 may include any number of users and any amount of text may be parsed and any number of software applications and/or functional features associated with software applications may be tested.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, the second user 110 may be a user that may want to discover semantic relationships, concepts, and/or groupings associated with data elements in one or more sources of information, and may want to determine which hypotheses associated with the semantic relationships, concepts and/or groupings satisfy confidence thresholds and are validated by testing against an application under evaluation 230. In certain embodiments, the second user 110 may be any type of user that may desire to have content, such as text or other content, to be parsed by a natural language processing system, such as natural language processing engine 143, and to determine constraints for fields of an application, constraints relating to an order of operations to be conducted by the application, and/or constraints for transitions occurring in the application (e.g. from one state of the application to another state). Additionally, the second user 110 may desire to have hypotheses associated with the constraints generated and/or tests for testing the hypotheses generated so that the constraints and/or hypotheses may be validated. Similarly, the second user 110 may be any type of user that may potentially desire to test one or more software applications created by the second user 110, created for the second user 110, under the control of the second user 110, being modified by the second user 110, associated with the second user 110, or any combination thereof. In certain embodiments, the second user 110 may be a user that may desire to test an application created, controlled, and/or modified by the second user 110, the first user 101, any number of other users, or any combination thereof. For example, the application may include one or more workflow items that have been modified and/or supplemented by the first user 101, the second user 110, and/or other users. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include human resource applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, gaming applications, internet-based applications, browser applications, mobile applications, service-based applications, productivity applications, video applications, music applications, social media applications, presentation applications, testing applications as described in U.S. patent application Ser. No. 15/905,362, filed on Feb. 26, 2018, software testing applications, hardware testing applications, computer testing applications, any other type of applications, any types of application services, or a combination thereof. In certain embodiments, the software applications may be applications under evaluation 230, which are described in further detail below. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, applications for interacting with testing software (e.g. as described in U.S. patent application Ser. No. 15/905,362, filed on Feb. 26, 2018), any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100.

In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform various operations of the static model discovery module 200, the model change management module 204, the dynamic model discovery module 206, the evaluators 220, the data transformers 232, the controller 224, the learning engine 226, the application under evaluation 230, any other component and/or program of the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof.

In certain embodiments, the server 140 may include a natural language processing engine 143, which may be comprised of hardware, software, or a combination thereof. The natural language processing engine 143 may include one or more modules and/or components including, but not limited to, a controller, one or more semantic libraries and/or databases, and/or one or more graph databases. In certain embodiments, the natural language processing engine 143 may reside and/or execute in the communications network 135 (such as in servers 140 and/or 150), the server 160, the first and/or second users devices 102, 111, any other component or device of the system 100, or any combination thereof. Illustratively, natural language processing engine 143 is shown as residing in server 140. In certain embodiments, the natural language processing engine 143 may reside in the external network 165, in other components of the system 100, and/or in any other desired system. In certain embodiments, the natural language processing engine 143 may be an off-the-shelf natural language system that has been enhanced by the functionality and features as described herein for the system 100, the method 900, and/or otherwise. In certain embodiments, the functionality and features provided by the system 100 and/or method 900 may be utilized to enhance componentry within an off-the-shelf natural language processing system and/or componentry external to the off-the-shelf componentry of the natural language processing system that facilitates the operation of the natural language processing system. In certain embodiments, the natural language processing engine 143 may be software-as-a-service accessed by the system 100, such as a service provided by the external network 165.

Notably, the natural language processing engine 143 may utilize, include, and/or incorporate the functionality of any existing natural language processing system. In certain embodiments, content, such as but not limited to text content, media content (e.g. image content, video content, etc.), text derived from audio content, any type of content, or any combination thereof, may be preprocessed by the system 100 to extract text from the content. The extracted text may then be fed to the natural language processing engine 143 for further processing. For example, the natural language processing engine 143 may utilize one or more natural language processing techniques to analyze the extracted text to determine a context associated with the text, relationship between words and/or groups of words in the text, meaning in the text, an intent of the text, a sentiment of the text, or any combination thereof. In certain embodiments, system 100 and/or the natural language processing engine 143 may be configured to include functionality to comprehend human language and/or speech, text in digital documents, text extracted from media content in digital files, text extracted from any type of audio content, text extracted from virtual reality content, text extracted from augmented reality content, any other comprehendible and/or parseable text, or any combination thereof. For example, the natural language processing engine 143 may be configured to comprehend human language and/or speech text that is spoken, written, symbolized, or a combination thereof, and may be configured to determine contextual information associated therewith. In certain embodiments, the system 100 and/or the natural language processing engine 143 may be configured to directly extract text from content without having the content being preprocessed first.

In certain embodiments, the natural language processing engine 143 may be configured to analyze and/or parse text (or other content and information) extracted from content included in inputs provided by any of the devices and components in the system 100, text extracted from content existing and/or accessible on the first and/or second user devices 102, 111, text extracted from content on any of the devices of the system 100, text extracted from content from any source external to the system 100 (e.g. external network 165), text extracted from content that has been scanned or otherwise uploaded into the system 100, text extracted from documents, text extracted from pictures, text extracted from video, text extracted from audio, or any combination thereof. The natural language processing engine 143 may apply and utilize natural language processing analysis techniques and/or rules to the text and/or content parsed by the natural language processing engine 143. For example, in certain embodiments, the natural language processing engine 143 may be configured to utilize its analysis techniques and/or rules to consider the context and meaning of words, phrases, sentences, paragraphs, or other groupings of words extracted from inputs or sources of information. Natural language processing techniques include, but are not limited, to n-gram, bag-of-words, co-referencing, part-of-speech tagging, stemming or lemmatizing, sentence breakdown, parsing, regular expression matching, subject or terminology extraction, relationship extraction, question and answer, similarity, annotating, rewriting, summarizing, sentiment analysis, intent analysis, statistical processing, machine learning, rules-based, algorithmic, translation, semantic, word embedding, concept extraction, other natural language understanding techniques, or any combination thereof. For example, in certain embodiments, the natural language processing engine 143 may be configured to utilize its analysis techniques and/or rules to consider the context and meaning of words, phrases, sentences, paragraphs, or other groupings of words extracted from inputs or sources of information. Additionally, the natural language processing engine 143 may be configured to determine the context and relationship of each word and/or group of words in an input to other words and/or groups of words in the same input and/or other different inputs or sources of information. In certain embodiments, the natural language processing engine 143 may be utilized to determine if text and/or content parsed from a particular input corresponds, relates, and/or matches with text and/or content existing in the system 100, such as in software code or documents associated with an application under evaluation 230 by the system 100, application pages and/or web pages, documents and files in the database 155, and documents, programs, and files utilized, provided, received and/or stored by the internal data sources 201, the external data sources 202, the static model discovery module 200, the model change management module 204, the dynamic model discovery module 206, the agglomerated models 208, the evaluators 220, the data transformers 232, the outputs 240, the controller 224, the learning engine 226, or any combination thereof.

In certain embodiments, the natural language processing engine 143 may process and/or store media content, such as photographs, video content, audio content (e.g. audio recording corresponding to the text, for example), augmented reality content, virtual reality content, and/or any other information in association with terms, concepts, keywords, and/or identifiers (e.g. such as in semantic libraries) so that when such terms, concepts, keywords, and/or identifiers are encountered on a subsequent occasion, the natural language processing engine 143 may rapidly detect the terms, concepts, keywords, and/or identifiers. In certain embodiments, the natural language processing engine 143 may determine associations and similarities between the parsed text and content obtained from a document source with terms, concepts, keywords and/or identifiers stored in the system 100, such as by recognizing patterns in the attributes that correspond to the text and content, by determining synonyms, similarities, antonyms and/or dissimilarities for the text and/or content, by recognizing images and/or video (or other content) having similarities to the media content stored in the system 100, by performing any other natural language processing capabilities, or any combination thereof.

The controller of the natural language processing engine 143 may serve as the component of the natural language processing engine 143 that controls the functions and operations of the natural language processing engine 143. In particular, the controller may be configured to direct the natural language processing engine 143 to parse text and/or content from an input provided by a source (e.g. document file), analyze the parsed text and/or content for concepts and keywords, determine whether the parsed text and/or content match and/or correlate with concepts, keywords, content, terms, and/or identifiers from various document sources, and/or perform any of the other operations of the natural language processing engine 143. In certain embodiments, the controller may be configured to pass the parsed text and/or content through a series of semantic libraries so as to determine an initial set of potential concepts, words, keywords, content, and terms related to the parsed text and/or content in the input. Additionally, the controller may utilize any number and/or any type of natural language processing algorithms to facilitate in this process. In certain embodiments, the concepts, keywords, content, and terms of the semantic libraries may be related to the parsed text and/or content based on the concepts, keywords, content and terms of the semantic libraries having words, letters, or sounds in common with the parsed text and/or content, based on the keywords, content, and terms being in a same subject matter area of the parsed text and/or content, based on the concepts, keywords, content and terms being typically used in conjunction with the terms used in the parsed text and/or content, based on the keywords, content, and terms having any relation to the parsed text and/or content, based on the concepts, keywords, content and terms matching the parsed text and/or content (e.g. matching nouns and verbs in the parsed text with terms in the libraries), or any combination thereof. The semantic libraries may incorporate any functionality and features of existing and/or traditional semantic query libraries. Additionally, the semantic libraries may be configured to include repositories of information and data, along with relationships and associations between concepts, keywords, words, content, and their meanings, to enable the controller to determine content and terms relevant and/or related to the parsed text and/or content obtained from the input. The semantic libraries may enable the controller to determine the relevant content and terms based on the intent and contextual meaning of the terms contained within the parsed text and/or content obtained from the input. In certain embodiments, the data and information contained in the semantic libraries may be structured and formatted so as to enable the controller to consider the context of the parsed text and/or content including, but not limited to, a location associated with the parsed text and/or content, an intent associated with the parsed text and/or content, variations in the parsed text and/or content, concepts associated with the parsed text and/or content, a country of origin associated with the parsed text and/or content, a language associated with the parsed text and/or content, a domain associated with the parsed content (e.g. human resources, banking, taxes, etc.), a type of grammar associated with the parsed text and/or content, any other contexts, or any combination thereof.

In certain embodiments, once the initial set of potential concepts, keywords, terms, and/or content are determined by the controller based on the passing of the parsed text and/or content through the semantic libraries, the controller may then compare the initial set of concepts, keywords, terms and/or content to a database, such as a graph database (e.g. database 155) to determine if additional terms and/or content are available and/or if more optimal terms and/or content related to the parsed text and/or content exist. The graph database utilized by the natural language processing engine 143 may incorporate any of the features and functionality of a traditional graph database, and may include additional concepts, keywords, terms, and/or content and machine instructions, media content, and/or information associated with the additional concepts, keywords, terms, and/or content. In certain embodiments, the graph database may utilize graph structures to represent and store data. Notably, the graph database may store relationships between the data and content stored within the graph database, and may store any type of data, content, and/or terms that may be utilized to assist in determining the content related to the parsed text and/or content obtained from the input. Data and content that is related to one another within the graph database may be readily retrieved by the graph database and/or system 100 based on their associations and/or correlations. In certain embodiments, the graph database may include additional concepts, keywords, content, and terms related to or associated with the parsed text and/or content that may not be contained in the semantic libraries. As a result, the graph database may serve as an additional resource for the controller to determine additional concepts, keywords, content, and terms associated with the parsed text and/or content that may be utilized by the natural language processing engine 143 for various purposes. If, based on the comparison to the graph database, additional concepts, keywords, terms, and/or content related to the parsed text and/or content obtained from the input are determined by the controller, these additional terms and/or content, along with the initial terms and/or content determined based on the semantic library comparison, may be utilized to obtain additional relevant information and/or content related to the text in the input.

In certain embodiments, the natural language processing engine 143 may be configured to parse text extracted from outputs of the application under evaluation 230. For example, the natural language processing engine 143 may be configured to parse text extracted from web pages of the application under evaluation 230, text extracted from content displayed on graphical user interfaces of the application under evaluation 230, text extracted from command line interfaces of the application under evaluation 230, such as, but not limited to, terminals or shells or API calls, including REST API calls, labels displayed and/or outputted by the application under evaluation 230 in connection with one or more fields, help text, menus, errors messages, and other information which may be outputted or inputted into the application under evaluation 230. In certain embodiments, the natural language processing engine 143 may group labels, help text, text from menus, text from errors, and other possible groups by utilizing a visual grouping algorithm, which may be employed to detect which groups of text on an output screen of the application under evaluation 230, for example, should be considered together. In certain embodiments, the grouping may be an input to more complex logic of the system 100. In certain embodiments, the natural language processing engine 143 may be configured to parse text extracted from internal and/or external document sources (e.g. internal and external data sources 201, 202), such as, but not limited to, software and/or hardware documentation and manuals, requirements (e.g. user stories), defects, tutorials, code comments, help text, release notes, and/or other sources. When parsing the text, the natural language processing engine 143 may extract meaning from the text, determine relationships between the words in the text, contextual information from the text, an intent in the text, a sentiment in the text, any other information, or a combination thereof.

The system 100, such as via the natural language processing engine 143 or other desired component of the system 100, may correlate the parsed text with one or more fields of the application under evaluation 230, an order of operations of the application under evaluation 230, and/or transitions of the application under evaluation 230 (e.g. transitioning from one state of the application under evaluation 230 to another state). Based on the correlations performed by the natural language processing engine 143, the system 100, such as via the natural language processing engine 143, may generate one or more constraint suggestions for the fields, the order of the operations, and/or the transitions of the application under evaluation 230. In certain embodiments, the system 100, such as via the natural language processing engine 143, may generate an initial confidence value for each suggested constraint. The confidence value may indicate a percentage (e.g. from 0-100 or other desired scale) or likelihood that the suggested constraint is accurate for the given field, order of operation, and/or transition of the application under evaluation 230. The confidence value generated for each suggested constraint may be generated based on a strength of the correlation performed by the natural language processing engine 143, a quality of the natural language processing of the textual and contextual information, a quantity of information sources that include information that reinforces and/or conflicts with the suggested constraint, a complexity of the constraint, any other factor, or a combination thereof.

In certain embodiments, the constraints suggested by and/or resident in the system 100 may include the suggested type of value for a given field and/or parameter (e.g. strings, numerical values, Boolean values, phone numbers, zip codes, any types of characters, any types of information, etc.), default values for the field and/or parameter (e.g. zero or another default value), a formatting setting for values for the field and/or parameter (e.g. precision of numbers and/or how values should appear visually), and a range of acceptable values for the field and/or parameter. In certain embodiments, constraints may include one or more confidences and may include metadata including a history of previously conducted hypothesis testing feedback related to the constraint. Additionally, the suggested constraints may indicate the precise order of operations to be performed with regard to the application under evaluation 230. For example, the suggested constraint may indicate which fields need to be completed before other fields, such as to ensure effective use of the application under evaluation 230 that does not result in errors, misuse of the application under evaluation 230, or a combination thereof. Furthermore, if certain documents sources include information indicating that a particular constraint has features in common with another constraint, is related to another constraint, depends on another constraint, or has some association with another constraint, the system 100, such as via the natural language processing engine 143, may merge or combine the constraints into a complex constraint or relational constraint. For example, if the value of one field is reliant on the value of another field or parameters, the system 100 may merge the constraints accordingly. In certain embodiments, the merged constraints may be simplified by the system 100.

In further embodiments, the system 100, such as via the natural language processing engine 143 may determine and/or detect potential defects and/or conflicts associated with the suggested constraints. For example, if text parsed from certain document sources indicates that a constraint for the application under evaluation 230 should be that the range of values for a particular field should be between 0-100 and text parsed from other document sources indicates that the constraint for the application under evaluation 230 should be 0-1000, and that the confidence value of the constraint having the range of values of 0-100 is higher than the constraint having the range of values between 0-1000, the system 100 may discard the constraint of the range of values between 0-1000 and may select the constraint having the range of values between 0-100. In certain embodiments, the system 100 may conduct hypothesis testing to increase the initial confidence value of a suggested constraint. For example, the hypothesis test may validate that a value outside of the 0-100 range (e.g. a value of 107) is rejected even though it is within the 0-1000 range, which thereby strengthens the confidence in the 0-100 range, while simultaneously lowering the system's 100 confidence in the 0-1000 range for the suggested constraint. A hypothesis (or hypotheses) for testing a constraint may indicate how the system 100 expects the application under evaluation 230 to operate using the suggested constraint, along with expected outputs when input values are utilized with fields, parameters, operations, and/or transitions of the application under evaluation 230. For example, the system 100 may generate a hypothesis for a constraint and may test various input values during testing of the application under evaluation 230. If the application under evaluation 230 fails based on the input values provided according to the hypothesized constraint, then the constraint confidence value may be lowered or the constraint may be discarded. However, if the application under evaluation 230 does not fail, and, instead, the input values are accepted and allow for expected functioning of the application under evaluation 230, the initial confidence value of the suggested constraint may be increased and/or the constraint may be kept by the system 100 as a candidate constraint.

Figure 2:
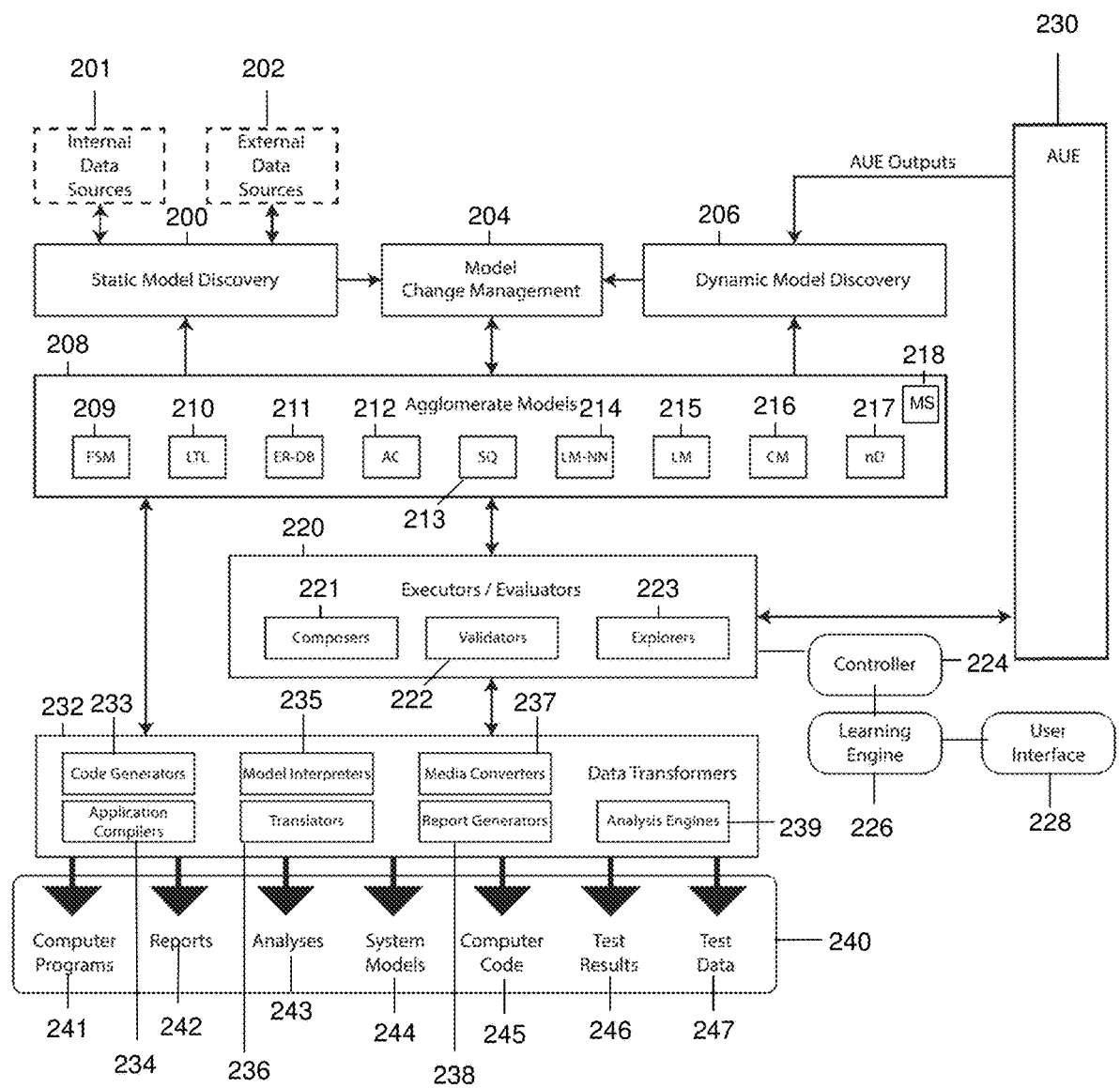
FIG. 2 is a schematic diagram illustrating various components of the system of FIG. 1, which facilitate the functional operation of the system of FIG. 1.
Figure 3:
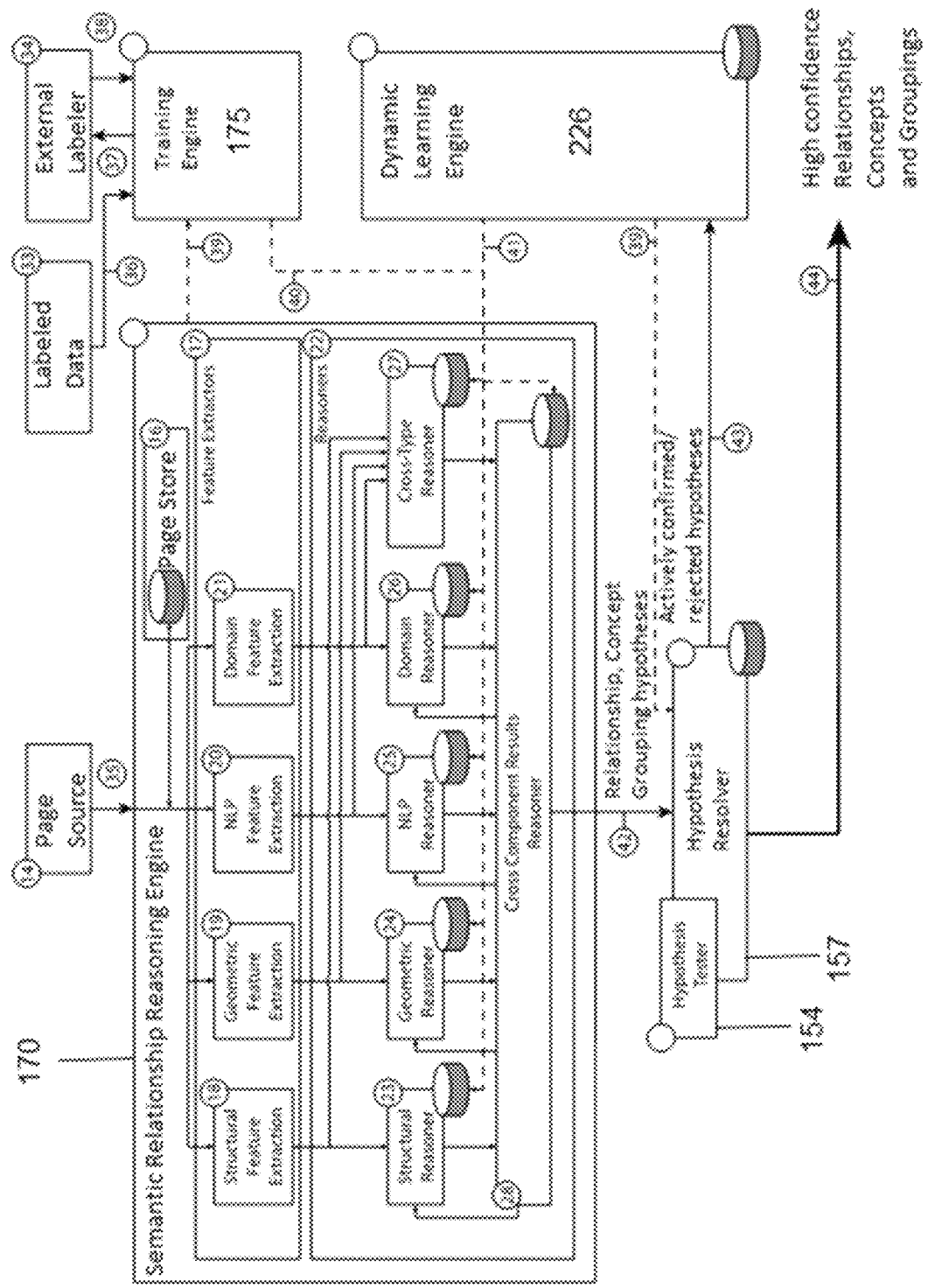
FIG. 3 is a schematic diagram illustrating further components of the system of FIG. 1, which facilitate the functional operation of the system of FIG. 1.

As the suggested constraints generated by the system 100 are tested, the results of the tests may be fed to the learning engine 226 for further processing. In certain embodiments, the learning engine 226 may adjust the confidence levels for the suggested constraint based on the results, may adjust confidence levels of constraints related to the tested constraints that the learning engine 226 is already familiar with or has access to, and may modify related constraints based on the results of the tests on the suggested constraint. Additionally, in certain embodiments, the learning engine 226 may update one or more constraints utilized with the agglomerated models 208, constraints utilized with the application under evaluation 230, constraints utilized with any other components, program, and/or function of the system 100 and/or as shown in FIGS. 1 and 2. The learning engine 226 may also provide instructions to the components of the system 100, such as the natural language processing engine 143, to adjust a manner in which the constraints are determined going forward for the application under evaluation 230, applications other than the application under evaluation 230, or a combination thereof.

Additionally, as the suggested constraints generated by the system 100 are tested, the results may also be fed to the executors/evaluators 220 of the system 100. For example, the results may be fed to the validators 222, which may be configured to evaluate the hypotheses generated by the system 100 and/or validate the tested constraints. In certain embodiments, the validation may be conducted by verifying that values inputted into the application under evaluation 230 that are outside of the constraint (or contrary to the constraint) are not allowed by the application under evaluation 230. In certain embodiments, validation may be conducted by verifying the suggested constraints relating to formatting of input values for fields. For example, if the system 100 attempts to input a value in a field of the application under evaluation 230 that has a precision outside the formatting of the suggested constraint and the application under evaluation 230 returns an error, the suggested constraint may be validated.

In certain embodiments, the server 140 may include a part-of-speech tagger 144, which may be software, hardware, or a combination thereof. In certain embodiments, the part-of-speech tagger 144 may reside within the natural language processing engine 143, be a companion program of the natural language processing engine 143, or be a separate program from the natural language processing engine 143. The part of speech tagger 144 may be a software program and/or function that may be configured to tag parts of speech for each word in a particular input. In certain embodiments, the part-of-speech tagger 144 may analyze text in an input, such as a sentence, and may attempt to assign, tag, and/or mark a part of speech for each word in the input. For example, the part-of-speech tagger 144 may label words in the input as nouns, verbs, adjectives, adverbs, prepositions, articles, direct objects, indirect objects, subjects of sentences, actions of sentences, and/or any other desired part of speech. The natural language processing engine 143 and/or the part-of-speech tagger 144 may be configured to perform substantive operations conducted by the system 100.

Much like server 140, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof. The server 150 may also include a knowledge engine 153, which may be software, hardware, or a combination thereof. In certain embodiments, the knowledge engine 153 may reside within the natural language processing engine 143, be a companion program of the natural language processing engine 143, or be a separate program from the natural language processing engine 143. In certain embodiments, the knowledge engine 153 may reside in server 140 and/or any another component of FIG. 1 or 2, and/or may be integrated into any other program and/or component of the system 100, such as, but not limited to, any component of FIG. 2, the hypothesis tester 154, the part-of-speech tagger 144, the constraint solver 156, etc. In certain embodiments, the knowledge engine 153 may access and/or store source data, concepts, models (e.g. agglomerated models 208 and/or hierarchical and/or graphical representations of functionality of an application under evaluation 230), and information obtained from the internal data sources 201, external data sources 202, the application under evaluation 230, any component of FIGS. 1 and 2, or combination thereof. Additionally, the knowledge engine 153 may interact and integrate with the natural language processing engine 143 and may receive the outputs of the analyses and interpretations conducted by the natural language processing engine 143. Based on the information accessed and/or stored therein, the knowledge engine 153 and/or the natural language processing engine 143 may generate constraint suggestions for fields of an application under evaluation 230, an order of operations for the application under evaluation, and/or transitions for an application under evaluation 230. Additionally, the knowledge engine 153 may determine types of values of fields and/or parameters, and/or any other information for a constraint and/or values for a constraint.

The server 150 may also include a hypothesis tester/constraint resolution engine 154. The hypothesis tester 154 may be software, hardware, or a combination thereof. In certain embodiments, the hypothesis tester 154 may reside within the natural language processing engine 143, be a companion program of the natural language processing engine 143, or be a separate program from the natural language processing engine 143. In certain embodiments, the hypothesis tester 154 may reside in server 140 or another component of FIG. 1 or 2, and/or may be integrated into any other program and/or component of the system 100, such as, but not limited to, any component of FIG. 2, the knowledge engine 153, the part-of-speech tagger 144, the constraint solver 156, etc. The hypothesis tester 154 may generate hypotheses from suggested constraints generated by the system 100, and one or more tests for testing the hypotheses, such as with the application under evaluation 230. In certain embodiments, the hypothesis tester 154 may store hypotheses, and/or generate new hypotheses as new information is being processed by the system 100. In certain embodiments, the new hypotheses may be generated based on the results of previous hypotheses tested by the system 100. The hypothesis tester 154 may also resolve conflicts between suggested constraints and determine compatibilities between suggested constraints, such as for merging the constraints to form a generalized and/or complex and/or relational constraint. Generalized constraints may be constraints built from one or more constraints and/or one or more hypotheses to satisfy a field's requirements. In certain embodiments, generalized constraints may involve detecting at least one pattern from constraints or hypotheses, and building the generalized constraint to satisfy the pattern and known hypotheses regarding the field. When testing hypotheses, the hypothesis tester 154 may determine input values for testing the hypotheses associated with the constraints and test the input values in the suggested constraints to either validate or reject the hypotheses. In certain embodiments, the hypothesis tester 154 may modify hypotheses and/or hypotheses tests based on the feedback generated in the system 100 based on the tests results of the hypotheses tests.

In certain embodiments, the server 150 may also include a constraint solver 156. The constraint solver 156 may be software, hardware, or a combination thereof. In certain embodiments, the constraint solver 156 may reside within the natural language processing engine 143, be a companion program of the natural language processing engine 143, or be a separate program from the natural language processing engine 143. In certain embodiments, the constraint solver 156 may reside in server 140 or another component of FIG. 1 or 2, and/or may be integrated into any other program and/or component of the system 100, such as, but not limited to, any component of FIG. 2, the hypothesis tester 154, the part-of-speech tagger 144, the knowledge engine 153, etc. In certain embodiments, the constraint solver 156 may independently or jointly with the hypothesis tester 154 generate a set of test cases to validate the hypotheses generated by the system 100. In certain embodiments, the constraint solver 156 may create a set of solutions for both the suggested constraint and also the negation of the suggested constraint.

In certain embodiments, the servers 140, 150, and/or 160 and/or any other component of the system 100 may include a reasoning engine 170, which may be a semantic reasoning engine. The reasoning engine 170 may be software, hardware, or a combination thereof, and may be configured to include feature extractors 17, reasoners 22, or a combination thereof. The reasoning engine 170 may be configured to interact with a learning engine 226 (i.e. dynamic learning engine 226 in the Figures), a training engine 175, a hypothesis resolver 157, a hypothesis tester 154, and/or any other component of the system 100 and/or outside the system 100. The reasoning engine 170 may be configured to determining concepts, relationships, and/or groupings between and/or among data elements including within information provided by a source (e.g. page source 14) based on features extracted from the information provided by the source. The source may include a document, a web page, a parameter (e.g. a parameter(s) in an API, such as a REST API or HTTP, etc.), a user story, requirements, help text, error messages, menus, media content, programming code, code comments, inputs and/or outputs of the application under evaluation 230 any type of source of information, or a combination thereof. During operation, the reasoning engine 170 may employ one or more feature extractors 17 to extract various types of features from the information provided by the source. The feature extractors 17 may be software, hardware, or a combination thereof, and may reside in, connect with, and/or interact with any component of the system 100.

One type of feature extractor 17 that may be utilized by the reasoning engine 170 is a structural feature extractor 18, which may be configured to extract structural features from the information and/or source of the information. In certain embodiments, structural features may include a feature of a source that may be derived from the structured document format of the source, such as an HTML document, in which the feature is transmitted. Structural features may include, but are not limited to, an entity's parents, children, font, color, origin, size constraints, metadata tags, any type of structural feature, or a combination thereof. As an example, the DOM structure of an HTML document (e.g. source) may create an explicit parent/child relationship between HTML elements of the document. Another type of feature extractor 17 that may be utilized by the reasoning engine 170 is a geometric feature extractor 19, which may be configured to extract geometric features from the information and/or source of the information. A geometric feature may be a feature that is derived from a rendered view of a source and/or information included in the source. Yet another type of feature extractor 17 that may be utilized by the reasoning engine 170 is a natural language processing extractor 20, which may be utilized to extract natural language processing features from the information and/or source of the information. A natural language processing feature may be a feature derived from the natural language that is included in the information of the source. For example, the natural language processing feature may be features extracted from the textual content of an input source document or a component within a source document. For example, natural language processing features may include, but are not limited to, part-of-speech taggings/markings on text (e.g. taggings performed on words and/or groups of words by the part-of-speech tagger 144), subjects, objects, actions and/or relations, tokenizations/nounizations/adverbizations/adjectivizations/verbizations (title "System for Providing Intelligent Part of Speech Processing of Complex Natural Language), regular expression matches, fuzzy matches, concepts from the text, sentiments determined from the text, intents determined from the text, accepted syntaxes, any type of natural language processing feature, or a combination thereof. A further type of feature extractor 17 that may be utilized by the reasoning engine 170 is a domain feature extractor 21, which may be configured to extract domain features from the information and/or source of the information. A domain feature may be a feature derived from the domain or area associated with the source. In certain embodiments, the source may simultaneously exist within multiple domains, from which, features may be extracted. For example, a domain could represent a company, a business area (Human Resource Management, Auto Manufacturing, etc.), the type of form used on the application under evaluation 230 (e.g. shopping cart), the language (American English, British English, French, etc.), the units (metric, English), the region in which the application under evaluation 230 is being utilized, and/or any other representable object, feature, aspect, or a combination thereof.

In order to determine the concepts, relationships, and/or groupings between and/or among data elements including within information provided by a source based on features extracted using the feature extractors 17, the reasoning engine 170 may utilize any number of reasoners 22 to make such determinations. In certain embodiments, the reasoners 22 may be software, hardware, or a combination thereof, any may be configured to reside in the reasoning engine 170 and/or in any component of the system 100. In certain embodiments, the reasoning engine 170 may utilize two or more reasoners 22, or, in other embodiments, one or more reasoners 22, where at least one of the reasoners 22 is a cross-type reasoner 27, which is discussed in further detail further below. In certain embodiments, the reasoning engine 170 may include a page store 16 that may facilitate semantic reasoning across temporarily dispersed source data. A first type of reasoner 22 that may be utilized to determine the concepts, relationships, and/or groupings is a structural reasoner 23, which may be configured to determine and/or infer the concepts, relationships, and/or groupings associated with data elements in the source based on the source's organizational structure as indicated by one or more structural features extracted by the structure feature extractor 18. Using the example above, the structural reasoner 23 may determine and/or infer that the DOM parent/child relationship applies to the data objects referenced within a particular HTML element. A second type of reasoner 22 that may be utilized to determine the concepts, relationships, and/or groupings is a geometric reasoner 24, which may be configured to determine and/or infer the concepts, relationships, and/or groupings associated with data elements in the source based on geometric features extracted by the geometric feature extractor 19 that indicate the absolute and/or relative placement of items within a rendered output. For example, a label rendered to the immediate left of a field of an application under evaluation 230 by the system 100 may be related (with a given confidence) to the field using an "is a" relationship. Similarly, a label field to the right of a field may be related to the field in a "constrains a" relationship or a "describes a" relationship at different confidence levels.

A third type of reasoner 22 that may be utilized to determine the concepts, relationships, and/or groupings is a natural language processing reasoner 25, which may be configured to determine and/or infer the concepts, relationships, and/or groupings associated with data elements in the source based on natural language processing features extracted by the natural language processing extractor 20 that include textual content of the source or a component within a source document. In certain embodiments, the natural language processing reasoner 25 may be configured to convert one or more language sources to include textual, audio, and/or audio-visual information into appropriate language reasoning interpretations. A fourth type of reasoner 22 that may be utilized to determine the concepts, relationships, and/or groupings is a domain reasoner 26, which may be configured to determine and/or infer the concepts, relationships, and/or groupings associated with data elements in the source based on domain features extracted by the domain feature extractor 21 that include real-world information about the function of the application under evaluation 230, the users of the application under evaluation, and/or the region in which the application under evaluation 230 is utilized. Further features and functionality associated with the domain reasoner 26 is provided in further detail in the method 900 described below.

A fifth type of reasoner 22 that may be utilized to determine the concepts, relationships, and/or groupings is a cross-type reasoner 27, which may be configured to determine and/or infer the concepts, relationships, and/or groupings associated with data elements in the source based on processing features from two or more of the feature extractors 17 (e.g. feature extractors 18-21) extracted by the feature extractors 17. A sixth type of reasoner 22 that may be utilized to determine the concepts, relationships, and/or groupings is a cross-domain reasoner/cross component results reasoner 28. The cross-domain reasoner 28 may be configured to identify, develop and/or improve concepts, relationships, or groupings through the processing of information from two or more reasoners 22 (e.g. reasoners 23-27). In certain embodiments, the cross-domain reasoner 28 may facilitate reasoning between multiple component reasoner outputs generated from the reasoners 23-27. As an example, the geometric reasoner 24 may identify a potential relationship between an input field on a form of an application under evaluation 230 and a label to the right of the input field; however, the geometric reasoner 24 may not be able to resolve between potential "is a", "constrains a" or "describes a" relationships with significant confidence. Using input from a domain reasoner 26, the cross-domain reasoner 28 may be able to lower the probability of a "is a" relationship based on the location of the label to the right of the input label and the locality (United States) within which the application under evaluation 230 is being utilized. In certain embodiments, the cross-domain reasoner 28 may further determine and/or infer a high probability that the relationship is a "constrains a" relationship between the field and the label based on an analysis of the label information provided by the natural language processing reasoner 25. In certain embodiments, the cross-domain reasoner 28 may further provide the specific constraint defined by the label in this relationship.

In certain embodiments, the cross-domain reasoner 28 may provide a shared context, which may utilize synonyms, similarity measures, clustering, machine learning, and other similar techniques to identify common concepts and support the sharing of information across domains and within the cross-domain reasoner 28. As an example, several reasoners 22 may all develop knowledge about the input of addresses in the input form 600 shown in FIG. 6 and identified by labels 3, 4, and 5. The structural reasoner 23 may determine and/or infer that a relationship exists between the first and second line of the address input field based on their location within a document object model (DOM) of the hypertext markup language (HTML) description of the page provided to a web browser. The geometric reasoner 24 may further support this relationship and may additionally infer that the "Home Address" and "Post office boxes will not be accepted" text labels are associated with the input fields. In certain embodiments, the natural language processing reasoner 25 may further infer that Post office boxes and home address both refer to address fields, and that "will not be accepted" excludes post office boxes as an acceptable format. In certain embodiments, the domain reasoner 26 may further infer the form of valid home addresses and possible constraints on their input. In this example, the cross-domain reasoner 28 may provide a framework that allows multiple reasoners 22 to share information and generate improved relationships, concepts, and confidences through iterative or recursive enhancement. Further features and functionality associated with the cross-domain reasoner 28 is provided in further detail in the method 900 described below.

Based on the concepts, relationships, and/or groupings associated with the data elements determined by the reasoning engine 170, the reasoning engine 170 may determine one or more hypotheses for the concepts, relationships, and/or groupings. The reasoning engine 170 may rank the hypotheses based on the confidence levels for each of the hypotheses. The ranked hypotheses may be fed to a hypothesis resolver 157, which may be included within the hypothesis tester 154 in certain embodiments. However, in other embodiments, the hypothesis tester 154 may be included within the hypothesis resolver 157. The hypothesis resolver 157 may be software, hardware, or a combination thereof, and may be configured to accept one or more ranked relationship, concept, and/or grouping hypotheses from the reasoning engine 170, and may generate high confidence relationships, concepts, and/or groupings. In certain embodiments, in order to generate the high confidence relationships, concepts, and/or groupings, the hypothesis resolver 157 may apply provided or learned thresholds to filter hypothesized relationships, concepts, and groupings from the ranked list. In certain embodiments, the hypothesis resolver 157 may utilize multiple confidence thresholds that may vary according to the type and content of each hypothesis. In certain embodiments, the hypothesis resolver 157 may apply thresholding to raw input hypotheses or to hypotheses that have been partially or even fully validated using the hypothesis tester 154 (e.g. testing conducted at step 916). Once the filtration is conducted by the hypothesis resolver 157, the hypothesis tester 154 may validate the subset of hypotheses associated with the relationships, concepts, and/or groupings, such as by conducting testing, based on the hypotheses and by utilizing hypothesis tests, against the application under evaluation 230 by the system 100. In conducting the testing, the hypothesis tester 154 may fully or partially validate the hypotheses by exercising the application under evaluation 230 (e.g. by using input values on fields, etc. and/or performing actions according to the hypotheses, etc.) and observing the resulting outputs of the application under evaluation 230 to actively test and validate the hypotheses. In certain embodiments, the hypothesis resolver 157 and/or hypothesis tester 154 may be components of one or more of the evaluators 220. In further embodiments, the hypothesis resolver 157 may accept inputs from human operators (e.g. first user 101) and/or from any component of system 100 to support or reject established hypotheses.

The results of the testing may be provided to a learning engine 226, a training engine 175, any other component of the system 100, or a combination thereof. In certain embodiments, the training engine 175 may reside within the learning engine 226, be separate from the learning engine 226, or have partial functionality within the learning engine 226. In certain embodiments, the training engine 175 may provide for the development and/or use of labeled data to train the various reasoners 22 of the system 100. In certain embodiments, the learning engine 226 may be configured to allow for the continuous training of the reasoners 22 by utilizing and processing information associated with actively confirmed and/or rejected hypotheses. In certain embodiments, the hypothesis resolver 157, for example, may provide results of actively confirmed and/or rejected hypotheses to the learning engine 226 for further processing. In certain embodiments, the results may be utilized by the learning engine 226 and/or the training engine 175 to adjust parameters, models (e.g. agglomerated models 208 or other models), vocabularies, dictionaries, and other features utilized by the system 100 to improve feature extraction, reasoning to determine concepts, relationships and/or groupings associated with data elements, and/or generation of hypotheses for subsequent semantic relationship discovery processes conducted by the system 100. Further details relating to the operative functionality of the training engine 175 are provided later in this disclosure.

In order to optimize the selection of features extracted by the feature extractors 17, the system 100 may include a feature selection evaluator 306, which may be software, hardware, or a combination thereof. In certain embodiments, the feature selection evaluator may reside in the learning engine 226, however, in other embodiments, the feature selection evaluator may reside in the training engine 175 and/or in any other component of the system 100. The feature selection evaluator 306 may be utilized by the system 100 to minimize the use of collinear and/or non-discriminatory features extracted from source documents, agglomerated models 208, any other source, or a combination thereof. The learning engine 226 may utilize actively confirmed and/or rejected hypotheses to determine those features which do not sufficiently correlate with the validated result achieved from testing conducted on the application under evaluation 230. In certain embodiments, these features may be excluded from feature extraction, and/or excluded from the reasoner models 54-57 (described in detail later in this disclosure), and/or excluded from the reasoner calculation of semantic relationships. In certain embodiments, features indicating a strong collinear relationship and a lack of independent discriminatory effect on the hypotheses may similarly be excluded from feature and/or reasoner processing. In certain embodiments, the system 100 may utilize the feature selection evaluator 306 in conjunction with the training engine 175 on labeled training data either instead of, or in conjunction with the use of the feature selection evaluator 306 in conjunction with the learning engine 226. In a further embodiment, features may be optionally added back into the set of features extracted by the feature extractors 17 and or utilized by a reasoner 22 to improve semantic relationship discovery. In such an embodiment, the hypothesis resolver 157 and learning engine 226 may be utilized to evaluate and adjust the addition of the feature. In certain embodiments, the system 100 may include a feature selector 78 that may control the extraction of features by individual feature extractors 17. The feature selector 78 may be software, hardware, or a combination thereof, and may be a standalone component or may reside in any component of the system 100.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may store a record of any and all information obtained from any data sources utilized by the system 100 to facilitate the operative functions of the system 100 and its components, store any information and data obtained from the internal and external data sources 201, 202, store the agglomerated models 208, store outputs generated by an application under evaluation 230, store feedback received from the first and second users 101, 110, the first and second user devices 102, 111 and/or other components of the system 100, store inputs entered into or utilized to interact with the application under evaluation 230, store software code 245 generated by the system 100, store reports 242 generated by the system 100, store analyses 243 generated by the system 100, store test results 246 generated by the system 100, store test data 247, store media content, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, versions, etc.), attributes of the device, any other information, or a combination thereof.

In certain embodiments, the database 155 may store algorithms and software facilitating the operation of the feature extractors 17, the reasoners 22, the natural language processing engine 143, the part-of-speech tagger 144, the knowledge engine 153, the hypothesis tester 154, the constraint solver 156, the hypothesis resolver 157, the resolution engine 170, the training engine 175, the learning engine 226, the controller 224, the user interface 228, the agglomerated models 208, the evaluators 220, the data transformers 232, the static model discovery module 200, the model change management module 204, the dynamic model discovery module 206, the application under evaluation 230, the feature selection evaluator 306, the system 100 itself, any software application utilized by the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. In certain embodiments, the database 155 may be configured to store dictionaries, semantic libraries for use by the natural language processing engine 143, information, text, and content obtained from outputs of the application under evaluation 230, information, text, and content obtained from document sources internal and/or external to the system 100, correlations between parsed text and any fields (e.g. input fields), an order of operations associated with the application under evaluation 230, and transitions of the application under evaluation 230, suggested constraints generated by the system 100, merged constraints, validated constraints, concepts, relationships, and/or groupings associated with data elements determined by the system 100, features extracted from information included in inputs, ranked lists of hypotheses, hypotheses generated by the system 100, filtered hypotheses, information learned by the learning engine 226 and/or information used by the training engine 175 to train components of the system 100, hypothesis testing results, hypothesis testing feedback, tests for testing hypotheses, constraints, and/or the application under evaluation 230, confidence values and/or levels of constraints, hypotheses, and/or techniques for determining the constraints (e.g. natural language processing techniques and/or machine learning techniques), confirmations and/or rejections of constraints, hierarchical and/or graphical models of the application under evaluation 230, functions of the application under evaluation 230, any type of function, any type of program, or a combination thereof, source concepts extracted from text parsed by the system 100, any information generated by the system, or a combination thereof. Furthermore, the database 155 may be configured to process queries sent to it by any device in the system 100 and/or from remote machines and/or devices in the external network 165.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an Internet protocol network, a content distribution network, a virtual private network, any network, or any combination thereof. In certain embodiments, the external network 165 may be accessed by the components of the system 100, such as the natural language processing engine 143 so that various sources of information may be consulted. For example, the natural language processing engine 143 may access resources of the external network 165 to compare information obtained from parsing text to information contained in the resources of the external network 165 to confirm analyses and interpretations made by the natural language processing engine 143 regarding the information and concepts. In certain embodiments, the external network 165 may be accessed by the components of the system 100 to obtain data and information that may potentially be utilized to discover models that may be included in the agglomerated models 208 (discussed later in this disclosure). For example, the system 100 may receive (or access) user stories, requirements, documentation, domain knowledge, existing test cases, computer software code, other data and information, or a combination thereof, provided by the external network 165 to assist in the creation and/or modification of one or more models of the agglomerated models 208. In certain embodiments, one or more components within the external network 165 may request the system 100 to test one or more of applications associated with the external network 165. In response, the system 100 may test the one or more applications and provide outputs 240 generated based on the testing to the external network 165. In certain embodiments, one or more of the models of the agglomerated models 208 may be transmitted to the external network 165.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. In certain embodiments, the software application or program may include the natural language processing engine 143 and/or the part-of-speech tagger 144. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface 228 that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface 228 for the software application may display content for viewing by the first and/or second users 101, 110 via the first and/or second user devices 102, 111. Additionally, the user interface 228 may display functionality provided by the software application that enables the first and second users 101,110 and/or the first and second computing devices 102, 111 to interact with the software application and any modules supporting the software application's functionality. In certain embodiments, the software application may be configured to include the static model discovery module 200, the model change management module 204, the dynamic model discovery module 206, the agglomerated models 208, the evaluators 220, the data transformers 232, the learning engine 226, the controller 224, the user interface 228, the natural language processing engine 143, the part-of-speech tagger 144, the knowledge engine 153, the hypothesis tester 154, the constraint solver 156, the hypothesis resolver 157, the reasoners 22, the feature extractors 17, the training engine 175, the reasoning engine 170, any program or process in the system 100, or any combination thereof.

Referring now also to FIG. 2, various components of the system 100 are illustratively shown. The components of FIG. 2 may be utilized to facilitate the operation of the system 100 and facilitate the functionality of the natural language processing engine 143 and/or the part-of-speech tagger 144. In certain embodiments, the components illustrated in FIG. 2 may reside partially within communications network 135, entirely within communications network 135, entirely within the servers 140, 150, 160, partially within the servers 140, 150, 160, partially within the external network 165 (e.g. if the system 100 utilizes and/or accesses a remote natural language processing service provided by the external network 165), or any combination thereof. The system 100 may include one or more internal data sources 201. The internal data sources 201 may be data sources that contain data and information internal to the devices, processes, programs, and/or components of the system 100. The data and information included in the internal data sources 201 may include, but are not limited to, user stories, requirements, documentation, domain knowledge, existing test cases, computer software code, other data and information, or a combination thereof, which may be sources of text and content to be analyzed by the natural language processing engine 144 and/or the part-of-speech tagger 144, and may be utilized to facilitate the creation of models and/or update models utilized by the system 100, such as, but not limited to, the agglomerated models 208. User stories, for example, may comprise, but are not limited to, natural language descriptions of one or more features of a particular computing system, software application, hardware device, software feature, and/or hardware feature. Requirements may include, but are not limited to, descriptions of requirements for one or more features of a particular computing system or software application. In certain embodiments, user stories and requirements may include images, pictures, videos, sounds, and/or any type of media content that may be analyzed by one or more components of the system 100. For example, if a particular user story includes pictures, the pictures may be web screens (i.e. actual or proposed), the pictures may be of steps to take in a particular process, pictures associated with a configuration of the system 100 or another system, etc. In certain embodiments, optical character recognition (OCR) or other image recognition techniques may be utilized to obtain text from pictures or media content, and may be utilized to facilitate the system's 100 understanding of the pictures or media content. Documentation may include, but is not limited to, digital documents containing information and data, which may be parsed by the natural language processing engine 143 and/or part-of-speech tagger 144 to obtain data and information which may be of use by the system 100, such as to construct one or more of the agglomerated models 208 and to compute and/or confirm confidence in interpretations and analyses derived from analyzed text. Domain knowledge may include, but is not limited to, knowledge pertaining to a computing environment in which a particular computing system or application operates, the rules governing the domain, knowledge obtained from devices and users in the domain, user workflows, configurations and constraints utilized in the development of a software application, data pipelines, domain specific acronyms, domain specific rules, domain specific formulas, any other domain information, or a combination thereof. Test cases may be tests that the system 100 may utilize to validate and/or verify a software program, computing system, hardware, and/or any thing that may be tested by the system 100. In certain embodiments, tests may comprise natural language descriptions of steps for the system 100 to take and items to verify in order to conduct a particular test. Computer software code may comprise, but is not limited to, a set of instructions that may form a computer program that may be executed by the system 100. The software code may also be analyzed and/or tagged by the natural language processing engine 143 and/or the part-of-speech tagger 144.

In certain embodiments, the system 100 may also include one or more external data sources 202. The external data sources 202 may be data sources that contain data and information external to the devices, processes, programs, and/or components of the system 100, which may be sources of text and content to be analyzed by the natural language processing engine 144 and/or the part-of-speech tagger 144. For example, the external data sources 202 may reside in networks outside of communications network 135 and may be not directly under the control of the system 100. The data and information included in the external data sources 202 may include, but are not limited to, user stories, requirements, documentation, domain knowledge, existing test cases, computer software code, web content, media content, data from external applications, outputs from devices external to the system 100, other data and information external to the system 100, or a combination thereof, which may be utilized to facilitate the creation of models and/or update models, such as the agglomerated models 208, which are discussed in further detail below. Additionally, the data and information in the external data sources 202 may be utilized by the natural language processing engine 143 and/or part-of-speech tagger 144 to confirm analyses, interpretations, and/or learning performed by the system 100. In certain embodiments, the data and information from the internal and external data sources 201, 202 (e.g. user stories, requirements, documentation, etc.) may be written and/or provided in natural language, in various natural language translations, and in various encodings. In certain embodiments, the data and information from the internal and data sources may be in provided in visual form (e.g. pictorially), in audible form, in source code, in pseudo-code, in virtual form, any form, or any combination thereof. In certain embodiments, the data and information may be in release notes, help files, and/or in other types of documents.

The system 100 may include a static model discovery module 200, which may be a software module executing within a software application that conducts the operations of the system 100. In certain embodiments, the static model discovery module 200 may comprise a combination of hardware and software. The static model discovery module 200 may perform processes associated with discovering model information from the internal and external data sources 201, 202, which may be utilized to generate one or more models of the agglomerated models 208. The models may comprise representations of systems, programs, functions, processes, or any combination thereof, which may be utilized as a basis for comparison to a computing system, program, application, and/or function to be analyzed and/or tested by the system 100. Model data extracted by the static model discovery module 200 from static sources, such as the internal and external data sources 201, 202 may contribute to the efficient and dynamic discovery of models associated with an application under evaluation 230. In certain embodiments, the static model discovery module 200 may be configured to discover model information from the internal and external data sources 201, 202 that does not generally change based on interactions between the system 100 and a particular application under evaluation 230. In certain embodiments, new documents from the internal and external data sources 201, 202 may be inserted and utilized at any time. In certain embodiments, a new document may include a new version of a previous document utilized by the static model discovery module 200. As a result, while a particular document may be static, the number of documents may not be. The static model discovery module 200 may be configured to recursively and continuously enhance model information extracted from the internal and external data sources 201, 202 through the use of agglomerated models 208 that have been developed from earlier static and dynamic model discovery, executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

In certain embodiments, the system 100 may include a model change management module 204, which may be a software module executing within a software application that conducts the operations of the system 100. In certain embodiments, the model change management module 204 may comprise a combination of hardware and software. The model change management module 204 may perform processes associated with modifying and/or updating agglomerated models 208 based upon static and dynamic discovery processes conducted by the static model discovery module 200 and the dynamic model discovery module 206, which is discussed in further detail below. In certain embodiments, the model change management module 204 may modify one or more models of the agglomerated models 208 specifically when source concepts extracted from the static and dynamic discovery processes are of a threshold confidence level or are within a range of confidence levels. In certain embodiments, the module change management module 204 may be configured to resolve conflicts and manage issues that may arise from simultaneous and asynchronous static and dynamic discovery. For example, if information obtained from a static discovery process performed by the static model discovery module 200 conflicts with information obtained from a dynamic discovery process performed by the dynamic discovery module 206, the model change management module 204 may arbitrate which information should be utilized to update the agglomerated models 208, which information should be excluded from updates to the agglomerated models 208, and which information should be modified prior to inclusion into the agglomerated models 208.

As indicated above, the system 100 may include a dynamic model discovery module 206, which may be a software module executing within a software application that conducts the operations of the system 100. In certain embodiments, the dynamic model discovery module 206 may comprise a combination of hardware and software. The dynamic model discovery module 206 may perform processes associated with discovering model information from a specific application under evaluation 230 that is being tested, analyzed, and/or explored by the system 100. For example, the dynamic model discovery module 206 may discover model information used to generate new models for the agglomerated models 208 or update existing models in the agglomerated models 208 based on information and data gathered from outputs generated based on interactions between the system 100 and the application under evaluation 230 being tested by the system 100. In certain embodiments, the dynamic model discovery module 206 may represent the model extraction component of the system 100 associated with interactions and hypothesis testing driven by evaluators 220 on the application under evaluation 230. In certain embodiments, the dynamic model discovery module 206 may recursively and continuously enhance model information extracted from interactions between the system 100 and the application under evaluation 230 through the use of agglomerated models 208 developed from earlier static and dynamic model discovery (i.e. previously conducted static and dynamic model discovery), executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

The system 100 may include a set of agglomerated models 208. In certain embodiments, the models may comprise representations of systems, programs, functions, processes, information, data, or any combination thereof, which may be utilized as a basis for comparison to a computing system, program, application, and/or function to be analyzed, and/or explored, and/or tested by the system 100. For example, a model of the agglomerated models 208 may be utilized by a software application performing the operations of the system 100 to determine whether a particular application under evaluation 230 has any defects, conflicts, or other issues based on a comparison of the model to one or more functions, features, and/or states of the application under evaluation 230. The agglomerated models 208 may include models contributed to or generated from an application under evaluation 230, and may be utilized to interpret unstructured and incomplete information obtained from the internal data sources 201, external data sources 202, the application under evaluation 230, any other source, or any combination thereof. For example, the agglomerated models 208 may be utilized to interpret information from JIRAs, application programming interface documents, user stories, code comments, requirements, release notes, tutorials, help texts, error messages, alerts, any other information, or any combination thereof. The agglomerated models 208 may be modified, updated, removed, replaced, or otherwise changed by the model change management module 204, and may be created based on information and data obtained from the internal and external data sources 201, 202 by the static discovery model module 200 and/or by information gathered from interactions by the system 100 with the application under evaluation 230 and/or other applications that have been already evaluated or will be evaluated in the future. In certain embodiments, an agglomerated model 208 or models may correspond with realized representations of the application under evaluation 230, unrealized representations of the application under evaluation 230 (e.g. a future specified capability of the application under evaluation which has not been fully implemented yet, a representation of the expected operations of the application under evaluation 230 where the actual operations may include differences, errors or inconsistencies, or other representation not fully consistent with the operations of the application under evaluation), or any combination thereof, in whole or in part.

The agglomerated models 208 may include any type of model that may be utilized to perform the functionality provided by the system 100, and may represent data and information common to the operation of the system 100 across all applications under evaluation 230, within common domains of the applications under evaluation 230, and in representation of a single application under evaluation 230. For example, the agglomerated models 208 may include, but are not limited to, finite state machine (FSM) models 209, linear temporal logic (LTL) models 210, entity relationship/database (ER-DB) models 211, activity (AC) models 212, sequence (SQ) models 213, learning model/neural network (LM-NN) models 214, language (LM) models 215, conceptual (CM) models 216, n-Dimensional physical (nD) models 217, mathematical models (MS) 218, petri nets, any other models, or any combination thereof. In certain embodiments, the FSM model 209 may be an abstract, mathematical model of computation that may be in exactly one of a finite number of states at any given time. The FSM model 209 may be defined by a list of its states, its initial state or states, and the conditions for each transition. In certain embodiments, features as described herein may be stored as part of a state or transition in an FSM model 209. In certain embodiments, the LTL models 210 may comprise modal temporal logic models with modalities that refer to time. The ER-DB models 211 may be composed of entity types, which classify things of interest, and may specify relationships that may exist between instances of the entity types. In certain embodiments, the ER-DB models 211 may include models corresponding to and/or associated with the graph databases utilized by the natural language processing engine 143 and/or other components of the system 100. In certain embodiments, entity relationships in the ER-DB models 211 may describe inter-related things of interest within a specific domain of knowledge. In certain embodiments, extracted features may be stored from the ER-DB models 211 and/or database 155. In certain embodiments, the ER-DB models 211 may represent the relations in a relational database. The AC models 212 may represent workflows of stepwise activities and actions with support for choice, iteration, and concurrency, such as with respect to activities conducted within an application being tested (e.g. application under evaluation 230). The SQ models 213 may be models that capture how objects in an application operate with one another and in what order.

The LM-NN models 214 may refer to a broad class of models that may be utilized in machine learning applications and/or artificial intelligence applications. In certain embodiments, the LM-NN models 214 may be trained based on internal and external feedback received by the system 100. Such feedback may relate to hypothesis testing, user feedback, and/or any other feedback received by the system 100. The LM models 215 may be probability distributions over sequences of words. For example, give a particular sequence of length m, a LM model 215 may assign a probability $P(w_1, \ldots, w_m)$ to the whole sequence. In certain embodiments, the LM models 215 may refer to a variety of models built over text, such as part of speech tagging, lemmatizing, parsing, regular expression matching, annotating, summarizing, rewriting, along with other techniques. The CM models 216 may be representations of systems, which may be made of the composition of concepts that are utilized to help, know, understand and/or simulate an application or domain concept. The CM models 216 may also include relationships amongst the various concepts. The nD models 217 may be models, which represent the geometric relationship of modeled components, and, in the case of dynamic physical models, their interactions. In certain embodiments, the nD models 217 may be linear (i.e. one-dimensional), planar (i.e. two-dimensional), spatial (i.e. three-dimensional), and/or multi-dimensional (i.e. n-dimensional). The MS models 218 may be models, which are mathematical and/or statistical models. For example, a sample MS model 218 may be a Bayesian network model.

The system 100 may include a plurality of evaluators 220 (can also be executors 220), which may be one or more software modules executing within a software application that conducts the operations of the system 100. In certain embodiments, the evaluators 220 may comprise a combination of hardware and software. The evaluators 220 may comprise a plurality of processes that generate data and information based on their interactions with a given application under evaluation 230. In certain embodiments, there may be several types of evaluators 220. A first type of evaluator 220 may be a composer 221, which may be configured to execute a series of steps on the application under evaluation 230 to generate results, which may be composed into one or more outputs. In certain embodiments, the composer 221 may execute a set of steps on the application under evaluation 230, while capturing screenshots or screen outputs for conversion into a media content video by a data transformer 232 of the system 100. For example, the media content video may be a training video to assist a user with navigating through various features and functions of the application under evaluation 230. As another example, the media content may be a problem recreation and/or debugging video to assist a developer or tester to debug a problem with the application under evaluation 230. In this scenario, the problem creation and/or debugging video may document the steps to recreate the problem that occurred in the application under evaluation 230 so that the developer or tester may readily perceive and/or visualize how the problem occurred. As yet another example, the media content may be a test verification video for facilitating the historical verification of tests for auditing purposes. When the test verification video is being utilized for auditing the verification of tests that have been run, the test verification video may be a video that proves that a test was executed and that the test was passed by the application under evaluation 230. Notably, any other media content may be generated by the composer 221 for any suitable and/or desired purpose as well. In certain embodiments, a composer 221 may execute a series of steps on an application under evaluation 230, while capturing statistical information, which may be utilized by an analysis engine 239 to generate analyses 243. In certain embodiments, a composer 221 may be configured to observe inputs into the application under evaluation 230 and outputs generated from a validator 222 and/or explorer 223 and generate composed output results. A second type of evaluator 220 is a validator 222, which may be configured to execute a series of steps on the application under evaluation 230 test-modeled functionality and/or to evaluate hypotheses generated by the system 100 as they relate to the functionality of the application under evaluation 230. The validators 222 may assist in developing high confidence agglomerated models 208 based on the series of steps executed or otherwise. In certain embodiments, the system 100 may require zero or more validators 222 to operate because trivial or special use cases exist where sufficient model confidence may be obtained without utilizing the functionality of the validators 222. A third type of evaluator 220 is an explorer 223, which may be configured to execute a series of steps on an application under evaluation 230 to dynamically explore and model the application under evaluation 230 in conjunction with the dynamic model discovery module 206. In certain embodiments, the explorers 223 may assist in the discovery and creation of models corresponding to the application under evaluation 230, correlating with one or more functions and/or features of the application under evaluation, or a combination thereof.

The system 100 may also include a controller 224, which may be software, hardware, or a combination thereof. The controller 224 may be configured to control the application, hardware, and/or components of the system 100 that facilitate the functionality of the system 100. In certain embodiments, the controller 224 may govern the high-level behavior of the system 100 itself, and may be configured to start the operation of the system 100, start subsystems of the system 100, and/or stop the operation of the system 100 and subsystems. In certain embodiments, the controller 224 may manage the configuration of the system 100, along with the configuration of the application under evaluation 230. The controller 224 may also direct the flow of control or flow of data between the various modules of the system 100, such as, but not limited to, the static model discovery module 200, the model change management module 204, the dynamic model discovery module 206, the evaluators 220, the data transformers 232, any other module or software in the system 100, or any combination thereof. In certain embodiments, the controller 224 may allocate and direct computing resources within the system 100. For example, the controller 224 may allocate and direct computing resources such as, but not limited to, memory (e.g. random-access memory), processors, and/or network resources. In certain embodiments, the controller 224 may also allocate and direct virtual computing resources, such as, but not limited to, containers, virtual machines, virtual processors, virtual memory (e.g. virtual random-access memory), cloud resources, virtual networks, other virtual resources, or any combination thereof. In certain embodiments, the controller 224 may direct the priority, the level of parallelism, and/or redundancy of various components in the system 100. In further embodiments, the controller 224 may control the backup and recovery of data and information stored and/or traversing the system 100. In still further embodiments, the controller 224 may be configured to control the operation of any program, hardware, and/or system associated with the system 100.

In addition to the controller 224, the system 100 may also include a learning engine 226. The learning engine 226 may be software, hardware, or a combination thereof, and may be supported by any suitable machine learning and/or artificial intelligence algorithms. The learning engine 226 may be a system that determines patterns and/or associations in behaviors or objects, such as, but not limited to, behaviors and/or objects of an application under evaluation 230 that is being analyzed and/or tested by the system 100. The learning engine 226 may allow for improved efficiency and accuracy of the system 100, while enabling more advanced static model discovery modules 200, evaluator 220 modules, and/or data transformer 232 modules. In certain embodiments, the learning engine 226 may allow for supervised learning, which may be supported through the user interface 228 that may be accessed and interacted with by the first user 101, the second user 110, and/or n-other users. For example, the learning engine 226 may receive inputs from the first and/or second users 101, 110 that endorse one or more models, endorse one or more constraints, test validation, perform sentence tagging in documents, etc. that may be utilized to enhance the agglomerated models 208, the operation of the system 100, and the knowledge base of the system 100. Additionally, the learning engine 226 may support unsupervised learning by automatically feeding validated test results from the evaluators 220 and statistical, performance-based, evaluator 220 results back through the system 100 as they are generated. In certain embodiments, the learning engine 226 may be configured to associate confidences or confidence levels with determined patterns and/or associations determined by the learning engine 226. Notably, the learning engine 226 may increase the confidence value of a particular pattern as the pattern is detected more frequently by the learning engine 226 over time, or lower the confidence value of the particular pattern if the pattern is contradicted in some regard or is not detected frequently over time. In certain embodiments, the confidence values may range from 0.0 to 1.0, however, any suitable scale may be utilized according to the present disclosure. In certain embodiments, the first user 101 and/or the second user 110 may be allowed to provide inputs via the first and/or second user devices 102, 111 to directly alter the confidence values. In certain embodiments, the first user 101 and/or the second user 110 may alter the confidence values via user interface 228 of the software application that performs the operative functions of the system 100. The user interface 228 may be made accessible to the first and/or second user devices 102, 111.

A sample use-case scenario may be utilized to illustrate how the first user 101 may adjust a confidence value. In this use-case scenario, the learning engine 226 may determine that each employee having an account being generated by an application under evaluation 230 has a phone number with a 0.95 confidence value. The first user 101 may review the learning engine's 226 determination and verify that the determination is accurate via an input transmitted via the first user device 102. Based on the first user's 101 verification, the learning engine 226 may increase the confidence value from 0.95 to 0.99 or even to 1.00 for an employee having a phone number. As another use-case scenario, the system 100 may determine from information gathered from the static model discovery module 200 that a user should not be able to change their date of birth in a user account created by an application. This determination, however, may be deemed as inaccurate or wrong by the first user 101. In this scenario, the learning engine 226 may alter the confidence value attributed to a user not being able to change the date of birth down to 0.01 or even to 0.00 from a higher confidence value originally determined by the learning engine 226. In contrast, the confidence value attribute to the user being able to change the date of birth may be increased by a certain amount by the learning engine 226. In certain embodiments, the verification of the learning engine's 226 determination may come from another source, such as another source of information. For example, a previous release or version of the application under evaluation 230 may have had the same or similar constraint. The finding of the same suggested constraint in the history of the application under evaluation 230 by the system 100 may provide a level of verification and allow improvement of the confidence associated with the suggested constraint.

The software application that facilitates the functional operations of the system 100 may include a user interface 228. The user interface 228 may be a graphical user interface, which may allow the first and/or second users 101, 110 and devices to interact with the software application performing the operations of the system 100. In certain embodiments, the user interface 228 may be a text-based terminal/command interface. The user interface 228 of the application may have both visual and auditory elements as output, and may be configured to receive keyboard inputs, mouse inputs, microphone inputs, screen inputs (e.g. touchscreen inputs) any type of inputs, or any combination thereof, from a user and/or device interacting with the user interface 228. In certain embodiments, the user interface 228 may be adapted to receive inputs and/or send outputs via user interface elements specifically configured for people with disabilities or challenging circumstances. In certain embodiments, an application programming interface (API) or software development kit (SDK) may be utilized for remote computers to connect with the system 100, and may input or output information as needed.

The system 100 may be configured to access, test, and/or interact with one or more applications under evaluation 230. An application under evaluation 230 may be a software application that the first and/or second user 101, 110 may wish to analyze and/or test by utilizing the system 100. In certain embodiments, instead of a user requesting that an application under evaluation 230 be analyzed or tested, a device, robot, and/or program may request the analyzing and testing of the application under evaluation 230. Based on interactions between the system 100 and an application under evaluation 230, information and data may be obtained to facilitate the creation of one or more models of the agglomerated models 208, the updating of one or more models of the agglomerated models 208, the verification of one or more models of the agglomerated models 208, or any combination thereof. In certain embodiments, the applications under evaluation 230 may be accessed, tested, and explored by utilizing the evaluators 220, which include the composers 221, validators 222, and explorers 223.

In certain embodiments, the system 100 may include a plurality of data transformers 232. In certain embodiments, the data transformers 232 may be software, hardware, or a combination thereof. The data transformers 232 may be configured to take one or more inputs, such as, but not limited to, the agglomerated models 208 and information and data obtained from the evaluators 220 to generate a useful output, such as by manipulating the data and information in the inputs. In certain embodiments, the system 100 may include any number of data transformers 232, which may include code generators 233, application compilers 234, model interpreters 235, translators 236, media converters 237, report generators 238, and analysis engines 239. The code generators 233 may be configured to access model inputs from the agglomerated models 208 and one or more objectives obtained from the evaluators 220, other data transformers 232, or even the code generators 233 themselves to create software code that satisfies the objectives. In certain embodiments, the software code generated by the code generators 233 may be utilized to fix a defect detected by the system 100 in an application under evaluation 230. In certain embodiments, the generated software code may be utilized to add, change, and/or remove functionality of the application under evaluation 230. In certain embodiments, the generated software code may be utilized to test or exercise the application under evaluation 230. In further embodiments, the generated code may be internal to the application under evaluation 230 or external to the application under evaluation 230, and the generated code may be related to the application under evaluation 230 or the generated code may benefit other software applications outside of the application under evaluation 230, such as applications that support the environment of the application under evaluation 230 (e.g. cloud programs, SaaS, operating systems, related applications, etc.). In certain embodiments, the generated code may be written and/or compiled by utilizing any suitable programming language, such as, but not limited to C, C++, Java, Python, and/or other language. In certain embodiments, the generated code may be generated at a high level, such as through the use of scripting languages, or low level, such as through the use of assembler/assembly languages. In certain embodiments, the generated code may be software that may enhance, replace, and/or modify the software application (including any modules) supporting the operation of the system 100. For example, the generated code may be utilized to update a start-up script based on execution patterns of the application under evaluation 230 or usage patterns of users of the application under evaluation 230.

The application compilers 234 may utilize outputs from the code generators 233 and compile the generated code into one or more computer applications/programs 241. In certain embodiments, the application compilers 234 may utilize inputs from the agglomerated models 208 and data from the evaluators 220, and incorporate such inputs and data when compiling software code. Inputs may also include compiler options, such as, but not limited to optimizations, performance goals, goals relating to the operation of the application under evaluation 230, configuration options, etc. The application compilers 234 may include target models (i.e. selected) of the agglomerated models 208 to improve directly or indirectly, such as by improving the functional features of the application under evaluation 230. The model interpreters 235 may be utilized in interpreting the models in the agglomerated models 208. In certain embodiments, the model interpreters 235 may comprise software, hardware, or a combination of hardware and software. An example use-case scenario of using a model interpreter 235 involves the use of a LM model 215. For the LM model 215, there may need to be a model interpreter 235, which is configured to understand the LM model 215 and how it relates to the application under evaluation 230, or how the application under evaluation 230 is understood by the evaluators 220. For example, the LM model 215 may tag or mark parts of speech or concepts found in paragraphs of text obtained from the internal or external data sources 201, 202, and the model interpreter 235 may be configured to comprehend the parts of speech as it pertains to the application under evaluation 230. In this case, the comprehension by the model interpreter 235 may comprise understanding an application page title, an application widget (e.g. text box, menu, pull down menu, radio button, etc.), an application user or role, an application message (e.g. alerts, emails, highlighted text, etc.), and/or any action in the application under evaluation 230 (e.g. create, read, update, delete, navigate, click, select, choose, enter, etc.)

The translators 236 may be software, hardware, or a combination thereof, and may take a model of the agglomerated models 208 or outputs from the evaluators 220, and convert them into a form that is more useful for a given task. As an example, a translator 236 may take a FSM model 209 and convert the FSM model 209 from a representation in a database 155 to a graphical representation, which may be more readily understood by the first or second user 101, 110. For example, the states of the FSM model 209 may be represented by circles or tiles, which further represent or illustrate a portion of the specific application that they represent. In certain embodiments, transitions between states may be shown as lines, which may have effects, which may imply characteristics of the transitions. Such effects may include adjusting thickness of a line to show popularity of use, a number of paths, complexity, or any other attribute. As another example, a translator 236 may take a LM model 215 or output from the evaluators 220, and convert them from English language to another language, such as Chinese or any other desired language, and vice versa. The translators 236 may also be utilized to translate from one encoding to a second encoding, such as from ASCII to Unicode. As yet another example, the translators 236 may take a SQL database (e.g. database 155) and convert it to a NOSQL database. Any translated information, programs, content, or output from the translators 236 may be fed into the agglomerated models 208, the evaluators 220, and/or the outputs 240 for further use by the system 100.

The media converters 237 of the system 100 may be configured to utilize outputs of the evaluators 220 and the agglomerated models 208 and convert them from a first form to a second form. In certain embodiments, the media converters 237 may be software, hardware, or a combination thereof. As an example of the operation of the media converters 237, the media converters 237 may take a textual description of the application under evaluation's 230 actions and steps, and convert them into listenable audio, which may be particularly useful to those with visual impairment. For those with hearing impairment, the media converters 237 could convert audio into text or images, which may be utilized for closed caption purposes in a presentation. The report generators 238 of the system 100 may be hardware, software, or a combination thereof, and may be utilized to create reports 242 based on the outputs of models of the agglomerated models 208, outputs from the evaluators 220, outputs from the data transformers 232, outputs from the application under evaluation 230, along with any other outputs received by the system 100. As an example, the report generators 238 may generate reports 242 that include the results of test cases executed on the application under evaluation 230 by the system 100. In certain embodiments, the outputs may simplify, summarize, and/or otherwise organize the data in the outputs. The analysis engines 239 may also comprise hardware, software, or a combination thereof. The analysis engines 239 may analyze the outputs of the agglomerated models 208, the outputs of the evaluators 220, the outputs of the data transformers 232 and any other outputs received by the system 100 to take an intelligent action. An intelligent action may include identifying a noteworthy condition based on the outputs analyzed, for example. The condition may be output in an analysis 243, and, in certain embodiments, the condition may be a defect detected in a test result 246. In certain embodiments, the condition may be based on the performance, popularity, complexity, or any other metric of a state or transition of a FSM model 209.

In addition to the functionality provided by the various components of the system 100 described above, the system 100 may also generate a variety of outputs 240 based on use of the components. The outputs 240 generated by the system 100 may include, but are not limited to, computer programs 241, reports 242, analyses 243, system models 244, computer code 245, test results 246, and test data 247. The computer programs 241 may be sets of instructions, which may be executed by various components of the system 100 to perform one or more tasks. As described above, the application compilers 234 may utilize outputs from the code generators 233 and compile the generated code into one or more computer applications/programs 241. The created computer programs 241 may be utilized to supplement functionality of an application under evaluation 230, integrated into an application under evaluation 230, replace functionality of the application under evaluation 230, modify functionality of the application under evaluation 230, or any combination thereof. The reports 242 may be generated by the report generators 238 of the system 100, and the reports 242 may be generated based on the outputs of models of the agglomerated models 208, outputs from the evaluators 220, outputs from the data transformers 232 outputs from the application under evaluation 230, along with any other outputs received by the system 100. The reports 242 may combine information from the outputs in a visual format, audio format, a format understandable by those with hearing and visual impairments, or any combination thereof. As an example, a report 242 may visually show all the successful paths that the evaluators 220 were able to take while testing the application under evaluation 230, along with any defects and/or any potential conflicts detected while exploring the functionality of the application under evaluation 230. Of course, any type of report 242 may be generated by the system 100, and a report 242 may include any information generated, received, stored, transmitted, and/or manipulated by the system 100.

The analyses 243 may be a type of output 240 of the system 100, which may identify a noteworthy condition, such as a condition associated with an application under evaluation 230 (e.g. a defect or conflict), a condition associated with one or more components of the system 100, any type of condition, or any combination thereof. The condition may be output in the analysis 243, and may be generated by the analysis engines 239. The system models 244 that may be output by the system 100 may comprise an architecture and/or behavior of the system 100 or any other system that the system 100 interacts with. For example, a system model 244 may be a model that describes an architecture or behavior of the application under evaluation 230, functions and products related to the application under evaluation 230, a computing environment associated with the application under evaluation 230, and/or an application related to the application under evaluation 230. In certain embodiments, the system model 244 may be one or more models from the agglomerated models 208. The computer code 245 may be an output 240 that comprises instructions for executing a task, such as on a processor of one or more of the components of the system 100. The computer code 245 may be generated by the code generators 233 and may be compiled by the application compilers 234. In certain embodiments, the computer code 245 may be obtained from the agglomerated models 208, the evaluators 220, and/or the data transformers 232. In certain embodiments, the computer code 245 may be utilized to supplement functionality of an application under evaluation 230, integrated into an application under evaluation 230, replace functionality of the application under evaluation 230, modify functionality of the application under evaluation 230, modify functionality of modules and applications supporting the functionality of the system 100, or any combination thereof.

The test results 246 of the outputs 240 may be results of executing various software, hardware, and/or application tests on components of the system 100, the application under evaluation 230, or any combination thereof. The test results 246 may be obtained based on tests and/or analyses conducted by the validators 222, the analysis engines 239, any of the evaluators 220, and/or any of the data transformers 232. In certain embodiments, the test results 246 may include information relating to a test, such as, but not limited to, an identifier identifying the type of test executed, inputs inputted into the test, outputs generated from the test, performance metrics associated with the test, or a combination thereof. In certain embodiments, the test results 246 may indicate whether the test was successful or a failure. If a failure occurred, additional data and metadata may be included with the test results 246, such as, but not limited to, call stacks, offsets within computer programs, source code, addresses of objects (e.g. objects within the application under evaluation or other components being tested), actual objects, memory dumps, screenshots, and/or any other information that may assist with failure remediation and/or analysis. Test data 247 may be any information that pertains to the assessment of software, hardware, applications, or any combination thereof, that the system 100 interacts with. In certain embodiments, the test data 247 may include results and/or outputs generated from the system 100 as a result of conducting hypothesis tests. In certain embodiments test data 247 may include inputs and outputs of tests, executable and/or manual test steps, expected results of tests, actual results of tests, functional results of tests, performance results of tests, or any combination thereof. In certain embodiments, test data 247 may include metadata describing the tests, such as, but not limited to, how many tests exist, the priority or ordering of tests to be utilized, computer resources (e.g. memory resources, processing resources, etc.) assigned to and utilized for executing certain tests, instructions or media content (e.g. pictures, video, audio, etc.) describing the application under evaluation 230, any other information, or a combination thereof.

Operatively, the system 100 may operate according to the following exemplary use-case scenarios as described in the context of method 900 and/or as otherwise described herein. Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, processing and/or analyzing, during a discovery process, information provided by a source that is associated with an application under evaluation 230; extracting features from the information by utilizing feature extractors 17; determining, based on the features, concepts, relationships, and/or groupings associated with data elements in the information by utilizing reasoners 22; generating hypotheses associated with the concepts, relationships, and/or groupings and corresponding confidence levels for the hypotheses; ranking the hypotheses relative to other hypotheses; determining if a subset of the hypotheses satisfy a threshold confidence level required by the system 100; filtering hypotheses satisfying the threshold confidence level; validating the hypotheses via one or more tests against the application under evaluation 230; providing results of the testing to a learning engine 226 to adjust parameters, models, vocabularies, dictionaries, and/or other components and/or features utilized in the discovery process to improve feature extraction, reasoning, and/or hypothesis generation for subsequent discovery processes; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-5 illustrates specific example configurations of the various components of the system 100, the system 100 may include any configuration of the components, which may include using a greater or lesser number of the components. For example, the system 100 is illustratively shown as including a page source 14, a page store 16, feature extractors 17, reasoners 22, reasoner models 54-57, a first user device 102, an external labeler 34, a second user device 111, a communications network 135, a server 140, a natural language processing engine 143, a part-of-speech tagger 144, a knowledge engine 153, a hypothesis tester 154, a constraint solver 156, a server 150, a server 160, a hypothesis resolver 157, a reasoning engine 170, a training engine 175, a feature selection evaluator 306, and a database 155. However, the system 100 may include multiple page sources 14, page stores 16, feature extractors 17, reasoners 22, reasoner models 54-57, first user devices 102, external labelers 34, second user devices 111, communications networks 135, servers 140, natural language processing engines 143, part-of-speech taggers 144, knowledge engines 153, hypothesis testers 154, constraint solvers 156, servers 150, servers 160, hypothesis resolvers 157, reasoning engines 170, training engines 175, feature selection evaluators 306, and databases 155, or any number of any of the other components inside or outside the system 100. Similarly, the system 100 may include any number of internal data sources 201, external data sources 202, static model discovery modules 200, model change management modules 204, dynamic model discovery modules 206, agglomerated models 208, evaluators 220, data transformers 232, controllers 224, learning engines 226, user interfaces 228, applications under evaluation 230, any other component, program, or device of the system 100, or a combination thereof. In certain embodiments, substantial portions of the functionality and operations of the system 100 may be performed by other networks and systems that may be connected to system 100. In certain embodiments, the architecture of the system 100 may relate key functional elements, while remaining agnostic as to the technical processes employed within each functional element of the system. For example, deep neural networks, natural language processing, Bayesian analysis, and a variety of other techniques may be employed within any of the primary functional elements (static model discovery module 200, model change management module 204, dynamic model discovery module 206, evaluators 220, and data transformers 232) as well as within the cross-functional elements of the system 100 (controller 224, learning engine 226, and user interface 228). In certain embodiments, the system 100 may operate in conjunction with a single application under evaluation 230 or across multiple applications under evaluation 230. In certain embodiments, the system 100 may operate in a multi-threaded environment with multiple instances of each module, program, and/or component of the system 100 operating in parallel. Such parallel operations may be limited, in certain embodiments, by predetermined limits or ratios, performance metrics and statistics, hardware availability, user interfaces, external interfaces, and access limitations associated with the application under evaluation 230.

Figure 9:
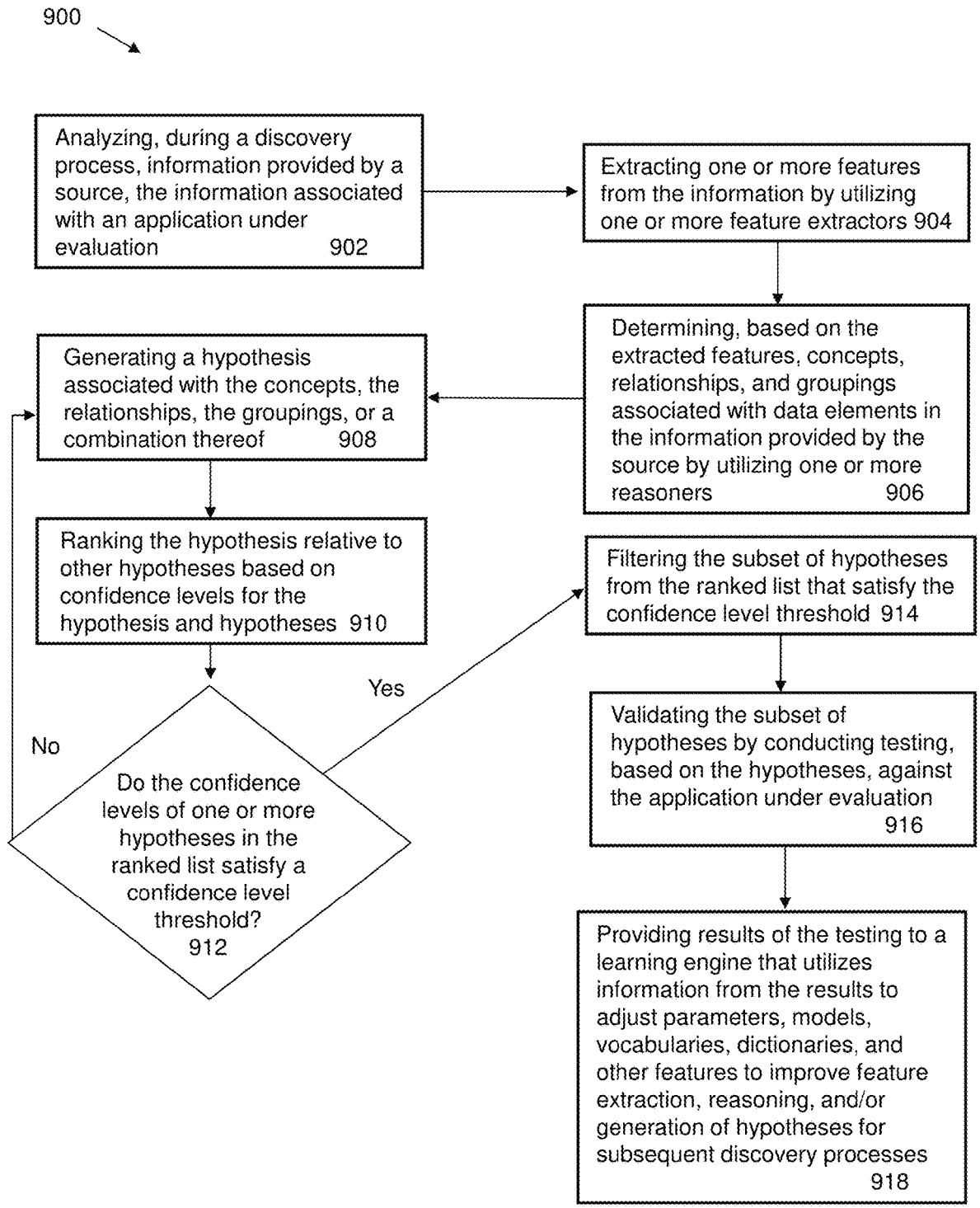
FIG. 9 is a flow diagram illustrating a sample method for discovering semantic relationships in computer programs according to an embodiment of the present disclosure.

As shown in FIG. 9, an exemplary method 900 for discovering semantic relationships in computer programs is schematically illustrated. In particular, the method 900 synergistically identifies and validates semantic relationships, concepts, and/or groupings of semantic relationships and/or concepts from within a static or dynamic, time varying, source input. In certain embodiments, a semantic relationship may be any relationship between two object representations that reference aspects of a common concept. In certain embodiments, a semantic relationship may be a relationship between two logically connected elements (e.g. data elements) within a source, such as, but not limited to, a label and its associated field in an application under evaluation 230. In particular, the method 900 utilizes reasoners 22, which develop associations using data from multiple feature set types and, as a result, can generate more reliable, robust, and complete sets of semantic relationships from input source data. The method's 900 use of organizational, geometrical, and other types of input sources with language input sources allows for a greater number of concepts, relationships, and groupings to be determined between and within the data sources. The method 900 may also utilize cross-component reasoning across sources and information types to further improve the quality and accuracy of the hypothesized concepts, relationships, and groupings. The method 900 may also incorporate a hypotheses resolver 157 and/or hypothesis tester 154 to further improve the quality of output concepts, relationships, and groupings, while providing feedback to a learning engine 226. Furthermore, the method 900 may utilize a training engine 175 that allows for the supervised generation of initial machine learning semantic relationship reasoning models, and the learning engine 226 to support the continuous modification of reasoning models and parameters based upon tested and resolved reasoning hypotheses.

For the purposes of method 900, a user, such as first user 101, or a device, such as first user device 102, may be interested in discovering semantic relationships, concepts, and/or groupings associated with data elements in one or more sources of information, and may want to determine which hypotheses associated with the semantic relationships, concepts and/or groupings satisfy confidence thresholds and which hypotheses would be confirmed or rejected based on tests conducted, based on the hypotheses, against an application under evaluation 230 by the system 100. A data element may be any data included within a source of information, which may have at least one or more distinctive characteristics from another data element within the source and/or another source. In certain embodiments, a data element may be identical to another data element included in the source and/or another source. At step 902, the method may include analyzing, such as during a discovery process for discovery semantic relationships associated with an application under evaluation 230, information provided by a source (e.g. source 14) or multiple sources. In certain embodiments, the analyzing may be performed and/or facilitated by utilizing the feature extractors 17, the reasoners 22, natural language processing engine 143, the part-of-speech tagger 144, the knowledge engine 153, the static model discovery module 200, the controller 224, the first user device 102, the second user device 111, the server 140, the server 150, the server 160, the communications network 135, any component of FIGS. 1-5, any combination thereof, or by utilizing any other appropriate program, network, system, or device. In certain embodiments, the information may be associated with an application under evaluation 230 and the source may be a program, a document, software code, labels, alerts, messages, titles, widgets, help text, menus, dictionaries, requirements, user stories, any type of source, or any combination thereof. In certain embodiments, the sources of the information may be consumed and/or produced by the application under evaluation 230.

In certain embodiments, a source may include structured data representing the output of the application under evaluation to the first user 101 or other computer program. As examples, structured data may include, but is not limited to, HTML, CSS, XML, XLS, DOC, TXT, WAV, MPG, AVI, MOV, SRT, JSON, SCC and other files, which may be analyzed by the system 100 to infer concepts, relationships and groupings between data elements contained within the information based upon the organizational structure of the information of the source In certain embodiments, structured sources may further include information defining how included information may be rendered to the first user 101 or to an output destination. This rendering information may be utilized by the system 100 to infer and/or determine concepts, relationships, and groupings resulting from the audio, geometrical, and/or temporal relationships of the rendered output. In certain embodiments, the sources may also include language data sources in which the use of written and/or aural information may further be utilized by the system 100 to infer and/or determine concepts, relationships, and groupings within and between data elements included in the information provided by the source. In certain embodiments, the system 100 may require one or more structured sources and one or more language sources to perform the method 900. In certain embodiments, a single source may simultaneously satisfy the requirements for a structured source and a language source. The source information may be input into the system 100 through an interface (e.g. interface 35) for analysis at step 902. In certain embodiments, the interface may be any suitable type of interface that may allow the input of information from the source into the system 100.

At step 904, the method 900 may include extracting one or more features from the information provided by the source by utilizing one or more feature extractors 17. In certain embodiments, the extracting of the one or more features from the information may be performed and/or facilitated by utilizing the feature extractors 17, the reasoners 22, natural language processing engine 143, the part-of-speech tagger 144, the knowledge engine 153, the static model discovery module 200, the controller 224, the first user device 102, the second user device 111, the server 140, the server 150, the server 160, the reasoning engine 170, the communications network 135, any component of FIGS. 1-5, any combination thereof, or by utilizing any other appropriate program, network, system, or device. The reasoning engine 170 may utilize one, two, or any number of feature extractors 17 to extract features from the information provided by the source. One type of feature extractor 17 that may be utilized with the method 900 is a structural feature extractor 18, which may be configured to extract structural features from the information and/or source of the information. Structural features may include a feature of a source that may be derived from the structured document format of the source, such as an HTML document, in which the feature is transmitted. Structural features may include, but are not limited to, an entity's parents, children, font, color, origin, size constraints, metadata tags, any type of structural feature, or a combination thereof. As an example, the DOM structure of an HTML document (e.g. source) may create an explicit parent/child relationship between HTML elements of the document, sibling relationships between HTML elements, ancestor relationships between HTML elements, offspring relationships between HTML relationships, any type of relationship between or among HTML elements, or any combination hereof. Another type of feature extractor 17 that may be utilized with the method 900 is a geometric feature extractor 19, which may be configured to extract geometric features from the information and/or source of the information. A geometric feature may be a feature that is derived from a rendered view of a source and/or information included in the source. In certain embodiments, a geometric feature may include over/under/above/left/right location information (e.g. coordinates) or other location information for a data element in an X-Y, X-Y-Z, or other coordinate space. In certain embodiments, a geometric feature may include size, shape, texture, and/or other information of various objects, widgets, labels, documents, code, labels, alerts, messages, titles, widgets, menus, images, media content, any type of data element, or any combination thereof.

Another type of feature extractor 17 that may be utilized with the method 900 is a natural language processing extractor 20, which may be utilized to extract natural language processing features from the information and/or source of the information. A natural language processing feature may be a feature derived from the natural language that is included in the information of the source. For example, the natural language processing feature may be features extracted from the textual content of an input source document or a component within a source document. In certain embodiments, natural language processing features may include, but are not limited to, concepts extracted from text, part-of-speech taggings/markings on text, sentiment information derived from text, intent information derived from text, tokenizations, nounizations, adverbizations, adjectivizations, and/or verbizations determined from text, relationship information associated with words and/or groupings of words in text, meanings of text, metadata describing properties of text (e.g. type of text, type of font, part of speech of text, subject, object, verb, noun, adjective, adverb, etc.), any type of information associated with text, or a combination thereof. Yet another type of feature extractor 17 that may be utilized with the method 900 is a domain feature extractor 21, which may be configured to extract domain features from the information and/or source of the information. A domain feature may be a feature derived from the domain or area associated with the source. The source may simultaneously exist within multiple domains, from which, features may be extracted. For example, a domain could represent a company, a business area (Human Resource Management, Auto Manufacturing, etc.), the type of form used on the application under evaluation 230 (e.g. shopping cart), the language (American English, British English, French, etc.), the units (metric, English), the region in which the application under evaluation 230 is being utilized, and/or any other representable object, feature, aspect, or a combination thereof.

Once the one or more features are extracted from the information provided by the source and/or the source itself, the method 900, at step 906, may include determining, based on the extracted features, semantic or other concepts, relationships, and/or groupings associated with data elements in the information/source by utilizing one or more reasoners 22. In certain embodiments, the determining of the concepts, relationships, and/or groupings associated with the data elements may be performed and/or facilitated by utilizing the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the reasoning engine 170, the communications network 135, any component of FIGS. 1-5, any combination thereof, or by utilizing any other appropriate program, network, system, or device. The reasoning engine 170 may utilize any number of reasoners 22 to make the determinations. For example, in certain embodiments, the reasoning engine 170 may utilize two or more reasoners 22, or, in other embodiments, one or more reasoners 22, where at least one of the reasoners 22 is a cross-type reasoner 27, which is discussed in detail further below. In certain embodiments, the reasoning engine 170 may include a page store 16 that may facilitate semantic reasoning across temporarily dispersed source data. One type of reasoner 22 that may be utilized to determine the concepts, relationships, and/or groupings is a structural reasoner 23, which may be configured to determine and/or infer the concepts, relationships, and/or groupings associated with data elements in the source based on the source's organizational structure as indicated by one or more structural features extracted in step 904. Using the example above, the structural reasoner 23 may determine and/or infer that the DOM parent/child relationship applies to the data objects referenced within a particular HTML element. Another type of reasoner 22 that may be utilized to determine the concepts, relationships, and/or groupings is a geometric reasoner 24, which may be configured to determine and/or infer the concepts, relationships, and/or groupings associated with data elements in the source based on geometric features extracted at step 904 that indicate the absolute and/or relative placement of items within a rendered output. For example, a label rendered to the immediate left of an input field of an application under evaluation 230 by the system 100 may be related (with a given confidence) to the input field using an "is a" relationship. Similarly, a label field to the right of an input field may be related to the input field in a "constrains a" relationship or a "describes a" relationship at different confidence levels.

Another type of reasoner 22 that may be utilized to determine the concepts, relationships, and/or groupings is a natural language processing reasoner 25, which may be configured to determine and/or infer the concepts, relationships, and/or groupings associated with data elements in the source based on natural language processing features extracted at step 904 that include textual content of the source or a component within a source document. In certain embodiments, the natural language processing reasoner 25 may be configured to convert one or more language sources to include textual, audio, and/or audio-visual information into appropriate language reasoning interpretations. Yet another type of reasoner 22 that may be utilized to determine the concepts, relationships, and/or groupings is a domain reasoner 26, which may be configured to determine and/or infer the concepts, relationships, and/or groupings associated with data elements in the source based on domain features extracted at step 904 that include real-world information about the function of the application under evaluation 230, the users of the application under evaluation, and/or the region in which the application under evaluation 230 is utilized. Referring now also to FIG. 8, is an example of a domain reasoner's 26 capability. For example, the domain reasoner 26 may develop knowledge about the form of the phone number identified by label 9 in FIG. 6. The format of phone numbers may be well established in the public domain. Recognizing that the form 600 in FIG. 6 contains a phone number through the actions of other reasoners 22, an electronic search of public documents may be initiated by the domain reasoner 26 to determine limits on the formatting of the phone numbers. This search may yield documents, which the domain reasoner 26 might interpret using natural language and/or machine learning techniques to determine that a phone number in the United States is currently formatted as shown in the table 800 in FIG. 8. After parsing and interpreting this publicly available domain information obtained through a web-search, the domain reasoner 26 may propose a rule that the numbering plan area code field must be three numeric digits. As a further example, the domain reasoner 26 may propose an additional constraint that the first digit of the numbering plan area code is not a '1'. As yet a further example, the domain reasoner 26 may further search for an explicit list of utilized numbering plan area codes and may propose a rule which tests that the provided area code is one of the listed numbers. Initial and learned confidences for these constraints may be established from domain information and/or learning information provided by the training engine 175 and/or the Learning Engine 226.

Another type of reasoner 22 that may be utilized to determine the concepts, relationships, and/or groupings is a cross-type reasoner 27, which may be configured to determine and/or infer the concepts, relationships, and/or groupings associated with data elements in the source based on processing features from two or more of the feature extractors 17 (e.g. feature extractors 18-21) extracted at step 904. A further type of reasoner 22 that may be utilized to determine the concepts, relationships, and/or groupings is a cross-domain reasoner/cross component results reasoner 28. The cross-domain reasoner 28 may be configured to identify, develop and/or improve concepts, relationships, or groupings through the processing of information from two or more reasoners 22 (e.g. reasoners 23-27). In certain embodiments, the cross-domain reasoner 28 may facilitate reasoning between multiple component reasoner outputs generated from the reasoners 23-27. As an example, the geometric reasoner 24 may identify a potential relationship between an input field on a form of an application under evaluation 230 and a label to the right of the input field; however, the geometric reasoner 24 may not be able to resolve between potential "is a", "constrains a" or "describes a" relationships with significant confidence. Using input from a domain reasoner 26, the cross-domain reasoner 28 may be able to lower the probability of a "is a" relationship based on the location of the label to the right of the input label and the locality (United States) within which the application under evaluation 230 is being utilized. In certain embodiments, the cross-domain reasoner 28 may further determine and/or infer a high probability that the relationship is a "constrains a" relationship between the input field and the label based on an analysis of the label information provided by the natural language processing reasoner 25. In certain embodiments, the cross-domain reasoner 28 may further provide the specific constraint based on the label in this relationship.

In certain embodiments, the cross-domain reasoner 28 may provide a shared context, which may utilize synonyms, similarity measures, clustering, machine learning, and other similar techniques to identify common concepts and support the sharing of information across domains and within the cross-domain reasoner 28. As an example, several reasoners 22 may all develop knowledge about the input of addresses in the input form 600 shown in FIG. 6 and identified by labels 3, 4, and 5. The structural reasoner 23 may determine and/or infer that a relationship exists between the first and second line of the address input field based on their location within a document object model (DOM) of the hypertext markup language (HTML) description of the page provided to a web browser. The geometric reasoner 24 may further support this relationship and may additionally infer that the "Home Address" and "Post office boxes will not be accepted" text labels are associated with the input fields. In certain embodiments, the natural language processing reasoner 25 may further infer that Post office boxes and home address both refer to address fields, and that "will not be accepted" excludes post office boxes as an acceptable format. In certain embodiments, the domain reasoner 26 may further infer the form of valid home addresses and possible constraints on their input. In this example, the cross-domain reasoner 28 may provide a framework that allows multiple reasoners 22 to share information and generate improved relationships, concepts, and confidences through iterative or recursive enhancement. In certain embodiments, any reasoner 22 may be able to access a history related to their corresponding past reasonings and/or determinations that the reasoners 22 have conducted. In certain embodiments, the history may be self-contained history, cross-component reasoning history, reasoner history, or a portion of the learning engine and/or knowledge engine 153. When accessing such histories, the reasoners 22 may, over time, provide more intelligent reasoning and/or determinations with regard to concepts, groupings, and/or relationships of data elements.

Once the feature extractors 17 and/or reasoners 22 are utilized to determine the concepts, relationships, and/or groupings associated with data elements in the source of information, the method 900 may proceed to step 908. At step 908, the method 900 may include generating one or more hypotheses associated with the concepts, relationships, and/or groupings associated with the data elements. The hypotheses may indicate how the system 100 expects an application under evaluation 230 to operate based on using input values and/or performing actions with fields, parameters, operations, and/or transitions of the application under evaluation 230. In certain embodiments, when generating the hypotheses, the system 100 may generate corresponding confidence levels for each of the generated hypotheses, which correlate to the likelihood that each hypothesis is correct. In certain embodiments, the generation of the hypotheses may be performed and/or facilitated by utilizing the hypothesis tester 154, the hypothesis resolver 157, the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the reasoning engine 170, the learning engine 226, the training engine 175, the communications network 135, any component of FIGS. 1-5, any combination thereof, or by utilizing any other appropriate program, network, system, or device. Once one or more hypotheses are generated, the method 900 may include, at step 910, ranking the generated hypotheses relative to other generated hypotheses and/or to other hypothesis existing and/or accessible by the system 100, such as according to the confidence level for each hypothesis. The reasoning engine 170, for example, may generate the ranked list of hypotheses about the concepts, relationships, and/or groupings within and across one or more sources of information. In certain embodiments, the ranking of the hypotheses relative to other hypotheses may be performed and/or facilitated by utilizing the reasoning engine 170, the hypothesis tester 154, the hypothesis resolver 157, the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the learning engine 226, the training engine 175, the communications network 135, any component of FIGS. 1-5, any combination thereof, or by utilizing any other appropriate program, network, system, or device.

At step 912, the method 900 may include determining if the confidence levels of the one or more hypotheses associated with the concepts, relationships and/or groupings of the data elements satisfy a confidence level threshold. In certain embodiments, the determining may be performed and/or facilitated by utilizing the reasoning engine 170, the hypothesis tester 154, the hypothesis resolver 157, the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the learning engine 226, the training engine 175, the communications network 135, any component of FIGS. 1-5, any combination thereof, or by utilizing any other appropriate program, network, system, or device. The confidence level threshold may be set by the system 100 itself (e.g. such as by the hypothesis resolver 157), by the first user 101, any other user (e.g. second user 110), any program of the system 100, any component inside or outside the system 100, or a combination thereof. If the confidence levels of the one or more hypotheses in the ranked list do not satisfy the confidence level threshold, the method 900 may revert back to step 908 and continue to generate hypotheses, or to any other suitable step of the method 900. If, however, the confidence levels of one or more of the hypotheses in the ranked list do satisfy the confidence level threshold, the method 900 may proceed to step 914.

At step 914, the method 900 may include filtering the subset of hypotheses from the ranked list of hypotheses having confidence levels that satisfy the confidence level threshold. In certain embodiments, the filtering may be performed and/or facilitated by utilizing the hypothesis tester 154, the hypothesis resolver 157, the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the learning engine 226, the training engine 175, the reasoning engine 170, the communications network 135, any component of FIGS. 1-5, any combination thereof, or by utilizing any other appropriate program, network, system, or device. For example, the hypothesis resolver 157 may accept one or more ranked relationship, concept, and/or grouping hypotheses from the reasoning engine 170, and may generate high confidence relationships, concepts, and/or groupings based on the filtering at step 914. In certain embodiments, the hypothesis resolver 157 may apply provided or learned thresholds to filter hypothesized relationships, concepts, and groupings. In certain embodiments, the hypothesis resolver 157 may utilize multiple confidence thresholds that may vary according to the type and content of each hypothesis and the number of available hypotheses (e.g. if there is only one hypothesis, the system 100 may set a lower threshold than if the system 100 has ten hypotheses to choose from). In certain embodiments, the hypothesis resolver 157 may apply thresholding to raw input hypotheses or to hypotheses that have been partially or even fully validated using the hypothesis tester 154 (e.g. testing conducted at step 916).

Once the filtration is conducted at step 914, the method may include, at step 916, validating the subset of hypotheses associated with the relationships, concepts, and/or groupings, such as by conducting testing, based on the hypotheses and by utilizing hypothesis tests, against the application under evaluation 230 by the system 100. In certain embodiments, the validating and/or testing may be performed by utilizing the hypothesis tester 154, the hypothesis resolver 157, the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the learning engine 226, the training engine 175, the reasoning engine 170, the communications network 135, any component of FIGS. 1-5, any combination thereof, or by utilizing any other appropriate program, network, system, or device. In conducting the testing, the hypothesis tester 154 may fully or partially validate the hypotheses by exercising the application under evaluation 230 (e.g. by using input values on fields, etc. and/or performing actions according to the hypotheses, etc.) and observing the resulting outputs of the application under evaluation 230 to actively test and validate the hypotheses. In certain embodiments, the hypothesis tester 154 and the hypothesis resolver 157 may be integrated into one another, however, in other embodiments, some or all of the functionality of the hypothesis tester 154 and hypothesis resolver 157 may be separated into separate programs. In certain embodiments, the hypothesis resolver 157 and/or hypothesis tester 154 may be components of one or more of the evaluators 220. In further embodiments, the hypothesis resolver 157 may accept inputs from human operators (e.g. first user 101) and/or from any component of system 100 to support or reject established hypotheses. In certain embodiments, hypotheses may be rejected and/or confirmed based on tested hypotheses having confidence levels (or scores) above, at, or below a selected confidence level threshold. In certain embodiments, hypotheses may be validated in an optimized order according to various optimization strategies (e.g. title "System for Optimizing System Resources and Runtime During a Testing Procedure", which is incorporated by reference herein), the hypotheses may be associated with or represented in constraints, and hypotheses tests may be conducted utilizing the constraints with the application under evaluation 230. In certain embodiments, the validation of hypotheses via the hypothesis tests may create and/or modify confidences of hypotheses and/or constraints.

At step 918, the method 900 may include providing results of the testing in step 916 to a learning engine 226, the training engine 175, any other component of the system 100, or a combination thereof. In certain embodiments, the providing may be performed and/or facilitated by utilizing the hypothesis tester 154, the hypothesis resolver 157, the reasoners 22, the feature extractors 17, the natural language processing engine 143, the part-of-speech tagger 144, the knowledge engine 153, the static model discovery module 200, the controller 224, the first user device 102, the second user device 111, the server 140, the server 150, the server 160, the learning engine 226, the training engine 175, the reasoning engine 170, the communications network 135, any component of FIGS. 1-5, any combination thereof, or by utilizing any other appropriate program, network, system, or device. At step 918, the hypothesis resolver 157, for example, may provide results of actively confirmed and/or rejected hypotheses to the learning engine 226 for further processing. In certain embodiments, at step 918, the results may be utilized by the learning engine 226 and/or the training engine 175 to adjust parameters, models (e.g. agglomerated models 208 or other models), vocabularies, dictionaries, and other features utilized by the system 100 to improve feature extraction, reasoning to determine concepts, relationships and/or groupings associated with data elements, and/or generation of hypotheses for subsequent semantic relationship discovery processes conducted by the system 100 via the method 900. In certain embodiments, the learning engine 226 may create and/or modify confidences of hypotheses and/or constraints.

The method 900 may include additional functionality and features. For example, the method 900 may include providing training data 39 to the hypothesis resolver 157 from the training engine 175 and/or the learning engine 226. The training data 39 may be provided to the hypothesis resolver 175 to establish and/or improve the models (e.g. machine learning models) and/or parameters that the hypothesis resolver 157 utilizes when performing its functions. In certain embodiments, the method 900 may include having the training engine 175 and/or the learning engine 226 utilize machine-learning techniques to maximize reasoning and thresholding performance by adjusting the vocabularies, dictionaries, and/or parameters utilized by the system 100 to perform the operative functionality provided by the method 900 (or system 100) based upon validated (i.e. confirmed) and/or invalidated (i.e. rejected) hypotheses. In certain embodiments, the method 900 may include having the learning engine 226 interpret actively confirmed and/or rejected hypotheses as new labeled data 33, which may be accessed by the training engine 175 for training purposes. In certain embodiments, labeled data 33 may be created by actively confirmed and/or rejected hypotheses, and/or confidence levels of hypotheses that are above, at, and/or below desired thresholds. In certain embodiments, the training engine 175 may interface with sources of labeled data 33 and/or an external labeler 34. In certain embodiments, labeled data may be provided through an external interface and/or from a data store. In certain embodiments, the external labeler 34 may enable a user (e.g. first user 101) and/or external device to label features and outputs associated with a feature processed source via the interface 39 (i.e. interface between the training engine 175 and the reasoning engine 170). In certain embodiments, source data from a source may be received by the reasoning engine via interface 35, labeled data 33 may be received at the training engine 175 via interface 36, processed features may be passed to the external labeler 34 via interface 37, and labeled data may be received from the external labeler 34 at the training engine 175 via interface 38. In certain embodiments, adjusted models, parameters, vocabularies, and/or dictionaries generated from the training engine 175 and/or learning engine 226 may be provided via interfaces 39, 40, 41 to the reasoning engine 170. In certain embodiments, the one or more concepts, relationships, and/or groupings determined for the data elements in the information provided by the source may be output via interface 42 to the hypothesis resolver 157, confirmed and/or rejected hypotheses may be transmitted to the learning engine 226 via interface 43, and provided or learned threshold confidence level relationships, concepts, and/or groupings may be outputted from the system 100 via interface 44. For example, the threshold confidence level relationships, concepts, and/or groupings may be outputted to potential consumers of the information (e.g. users, devices, and/or programs), stored in a data store (e.g. database 155) for future use, and/or providing in response to a query by a service (e.g. consumer service).

Figure 4:
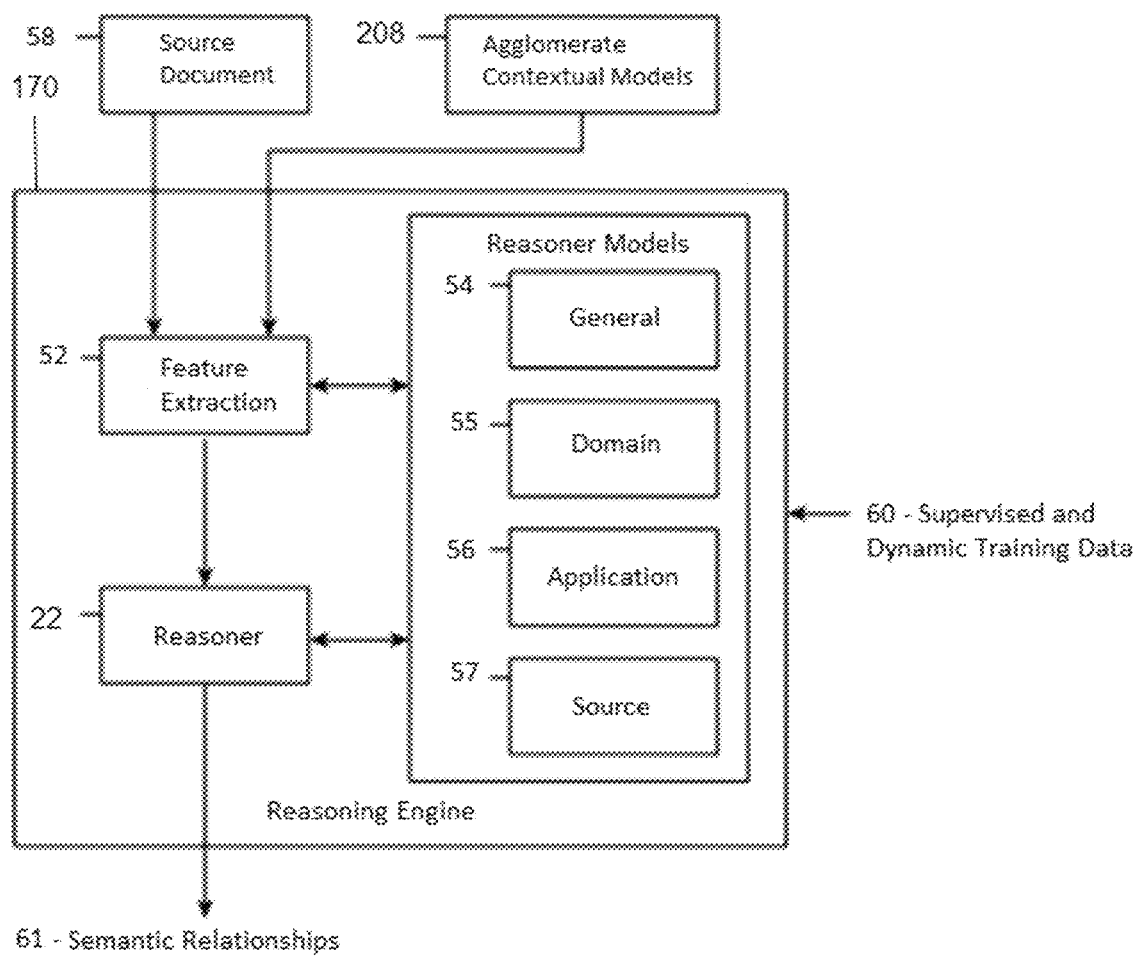
FIG. 4 is a schematic diagram illustrating components of the system of FIG. 1, which facilitate feature extraction and the determination of semantic relationships associated with data elements based on extracted features.

In certain embodiments and referring now also to FIG. 4, the system 100 and the method 900 may utilize a unique embodiment of the reasoning engine 170 to conduct the reasoning functionality provided by the method 900 and/or system 100. In certain embodiments, the reasoning engine 170 may be configured to process a source document or documents 58 (or page source 14, for example) using information from agglomerated contextual models 208 (or other models) to extract sufficiently differentiated features for processing by a reasoner 22 and/or feature extractor 52 (also feature extractors 17) and as updates to reasoner models 54-57 (agglomerated models 208 in certain instances). A reasoner 22, using models 54-57 (or other models), based on correlation and prediction mechanisms, such as least squares approximation, and/or machine learning techniques (Bayes classifications, decision trees, logistic regressions, support vector machines, clustering algorithms, ensemble learning algorithms, principal component analyses, singular value decompositions, independent component analyses, regularization algorithms, dimensionality reductions, meta learning, supervised learning, reinforcement learning, linear classifiers, unsupervised learning, artificial neural networks, association rule learning, hierarchical clustering, anomaly detecting, deep learning, any other machine learning technique, or a combination thereof), may identify semantic relationships between raw or processed data elements found within the source document(s) 58. The reasoning engine 170 may utilize general models 54, domain models 55, application models 56, and/or source specific models 57, which models may be static or time varying, in the identification of semantic relationships. Conceptually, a general model 54 or models may span all applications of the reasoning engine 170, one or more domain models 55 may represent model features specific to a particular application domain (e.g. domain of the application under evaluation 230), one or more application 56 models may represent the specific features associated with the identification of relationships for the application under evaluation 230, and source models 57 may represent the specific features associated with a particular source document 58 or documents. In certain embodiments, the reasoning engine 170 may obtain supervised and/or dynamic training data 60 (such as from training engine 175) in a form that allows for the training and modification of reasoner models 54, 55, 56, 57. In certain embodiments, unsupervised learning may also be utilized in reasoning engine 170 to improve various confidences, to improve various labelling, and/or improve various hypotheses. For example, as the system 100 operates and more information is processed by the system 100 confidences for determined concepts, relationships, and/or groupings may be increased as such concepts, relationships and/or groupings recur and/or are validated via hypothesis testing. As indicated above, the reasoning engine 170 may output one or more semantic relationships, concepts, and/or groupings 61 associated with data elements found within a source and/or across sources, which may include associated relationship confidences. In further embodiments, some or all of the functionality of the reasoning engine 170 may reside outside the system 100. For example, to detect features in a rendered image of a screen, an embodiment of the system 100 may utilize in part, or in whole, the capabilities of an image analysis service such as a hypothetical modified version of a cloud vision API. In certain embodiments, the training engine 175 and/or the learning engine 226 may be configured to train or improve a model (e.g. agglomerated models 208), a parameter (e.g. a parameter of an application under evaluation 230 used to support various functions of the application under evaluation), a weight (e.g. a weight assigned to a hypothesis, semantic relationship, concept, grouping, etc.), a dictionary (e.g. a dictionary utilized by the natural language processing engine 143 when parsing text or for other purposes), a threshold (e.g. a confidence threshold), a confidence (e.g. a confidence for a hypothesis and/or determination made by the system 100), a feature extractor 17, a reasoner 22, a filter (e.g. a filter utilized by the hypothesis resolver 157 to filter hypotheses from a list of hypotheses, for example) associated with and/or utilized to generate a future hypothesis. In certain embodiments, the training or improving may be based on a confirmation and/or rejection of a current hypothesis (e.g. a hypothesis being currently tested and/or evaluated by the system 100).

Figure 5:
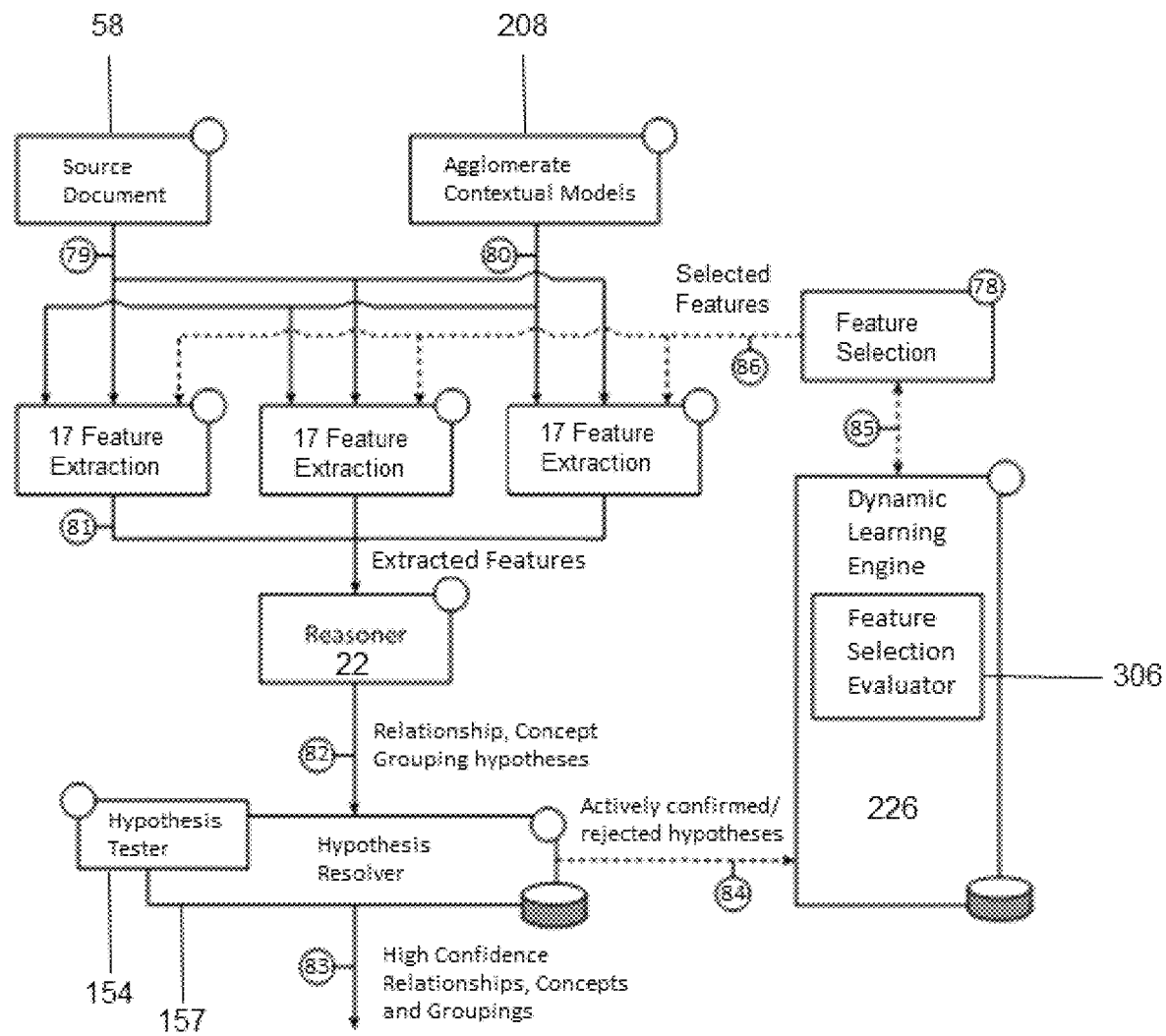
FIG. 5 is a schematic diagram illustrating components of the system of FIG. 1, which facilitate feature extraction, the determination of semantic relationships associated with data elements based on extracted features, the generation of hypotheses associated with the semantic relationships, the testing of the hypotheses, and the learning of information based on the testing of the hypotheses.

In certain embodiments and referring now also to FIG. 5, the system 100 and the method 900 may utilize a feature selection evaluator 306 to perform intelligent feature selection for the purposes of the system 100 and/or method 900. The feature selection evaluator 306 may be configured to select feature sets based on a measure of the cost and/or benefit of individual or feature groups. In certain embodiments, the feature selection evaluator 306 may be utilized by the system 100 to minimize the use of collinear and/or non-discriminatory features 81 extracted from source documents 58, agglomerated models 208, any other source, or a combination thereof (source documents and/or agglomerated models 208 may be received by the feature extractors 17 via interfaces 79 and/or 80). In this embodiment, the learning engine 226 may utilize actively confirmed and/or rejected hypotheses 84 to determine those features which do not sufficiently correlate with the validated result achieved from testing conducted on the application under evaluation 230. In certain embodiments, these features may be excluded from feature extraction, and/or excluded from the reasoner models 54-57, and/or excluded from the reasoner calculation of semantic relationships 82. In certain embodiments, features indicating a strong collinear relationship and a lack of independent discriminatory effect on the hypotheses may similarly be excluded from feature and/or reasoner processing. In certain embodiments, the method 900 and/or system 100 may utilize the feature selection evaluator 306 in conjunction with the training engine 175 on the labeled training data 37, 38 either instead of, or in conjunction with the use of the feature selection evaluator 306 in conjunction with the learning engine 226. In a further embodiment, features may be optionally added back into the set of features extracted by the feature extractors 17 and or utilized by a reasoner 22 to improve semantic relationship discovery. In such an embodiment, the hypothesis resolver 157 and learning engine 226 may be utilized to evaluate and adjust the addition of the feature. In certain embodiments, the system 100 may include a feature selector 78 that may control the extraction of features by individual feature extractors 17. Such embodiments may improve semantic relationship generation by reducing co-linear features that might negatively impact model performance, and by reducing the extraction of non-discriminatory features. The elimination of features will have associated positive impacts on processing, memory, storage, and network performance.

The functionality of the system 100 and/or method 900 may be exemplified via one or more use-case scenarios. In a first use-case scenario, the use-case scenario may involve semantically relating a label to a field (e.g. an input field) by utilizing the system 100 and/or method 900. The relationships between and/or among data elements determined by the system 100 and/or method 900 may or may not establish or improve the inferable meaning of a jointly referenced concept, but in many cases identified relationships will relate information, which when used in combination, serves to increase a user's (e.g. first user 101) and/or device's (e.g. first user device 102) understanding of a concept, related field, hypothesis, and/or constraint. In this use-case scenario, the solution might relate a "birthdate" label to an otherwise unidentified input field on a digital form of an application under evaluation 230. A preferred embodiment might identify this semantic relationship along with the system's 100 confidence that the relationship between the "birthdate" label and the input field on the form exists. A user (e.g. first user 101) and/or device of the output semantic relationship could establish that a date should be inputted into the unlabeled input field because of equivalence class information derived from the associated birthday label. Such a user and/or device may further infer additional understandings and/or constraints that may help such systems test, navigate, or otherwise use the source application under evaluation 230. For example, the system 100 may further determine, because the "birthdate" field was part of a larger request for identifying information, that a source system should not accept the input of a future date in the field related to the label "birthdate" as birthdates, when used as identifying information, can only reference dates in the past. Through other identified relationships, a user and/or device may further understand whose birthday is being referenced. This use-case scenario indicates the utility and clear benefit the identified semantic relationships to consumers of this data such as systems (e.g. system 100) attempting to test, navigate, interpret, or otherwise interact with the processed sources.

In a second use-case scenario, the system 100 and/or method 900 may be utilized during the processing of a web form, such as the web form 600 shown in FIG. 6. This use case may be utilized to illustrate the complexities of interpreting a form and to illustrate how the system 100 can develop correct label to field semantic relationships and resolve ambiguities, which currently existing systems are unable to resolve. In this use-case scenario, in order to understand the functionality of an application under evaluation 230 to automatically test, exercise, navigate or search the application under evaluation 230, it is beneficial to develop an interconnected representation of the actions taken, the information displayed, or the audio played (or other media content outputted) by the application under evaluation 230. For example, the application under evaluation 230 may display a form (e.g. form 600 of FIG. 6) asking a user to submit contact information in the form of a name, address, telephone number and email address. Existing image-based segmentation solutions may be able to associate line 1 with the "first" label and the "preferred nickname" label with line 2. However, depending on the precise distance between the fields and weightings applied, such systems may associate the overall "name" label with line 1 and the "first" label with line 2. In such a case, it may be possible that the "preferred nickname" might not be associated with line 2 at all, or both associations may be identified.

In order to automatically understand this computer program form of the application under evaluation 230 for the purposes of automatic search, test, program exercise, or navigation, the system 100 and/or method 900 may deduce from this rendered information that a name is required and that the name is further subdivided into a first name, middle name, last name, and preferred nickname. In this use-case scenario, both lines 3 and 4 should be associated with the home address field. In addition, it is desirous for the system 100 and/or method 900 to understand that the phrase, "Post office boxes will not be accepted," is also associated with line 3 as it places a navigation and testable constraint on the input of line 3. Similarly, it is desirous for the system 100 and/or method 900 to understand the constraints placed on 6 by the text at 7 and 8. Some information within the form 600 may be time sensitive and the changing data is both important to the interpretation of the form 600 and is a possible source of confusion in parsing the form results. Dynamic forms may respond to input such as the typing of a phone number in 6 by automatically inserting the dash 9 after the three numbers of the local phone number are input by the user. The system 100 further knowledgeable of the locale, in which the system 100 is employed, may determine and/or infer and test correct or incorrect behavior based on whether or not the placement of the dash is consistent with local telephone number formatting rules. The system 100 may utilize static or dynamic information sources to establish the locale specific considerations, structure and format of a phone number. For example, the ITU-T E.164 standard, The International Public Telecommunication Numbering Plan, published by the ITU Telecommunication Standardization Sector, may be input as a source into the system 100 to establish the expected format of the phone number components. Conversely, the system 100 may dynamically interrogate sites (e.g. websites) which provide telephone number validation services or sites which will automatically generate valid telephone numbers.

Similarly, in this use-case scenario, the Submit Button 11, illustratively shown as greyed out in FIG. 6, may change color and indicate its active state after all of the required fields are completed. Such a change noted may be key to understanding the order of operations required and/or a set of fields which are required (or optional) to successfully navigate, exercise or test the application under evaluation 230. As a further example of temporally important information, the colored warning information 12 may appear after the Submit Button 11 is pressed. In the example, the warning 12 establishes a constraint on the email address field 10. In certain embodiments, such warning information may be shown to the first user 101 through a pop-up window, through an audio warning, through a change of color or font of the label for field 10, through a change of color or border of the input field 10, through the display of a graphic next to the offending field, through a combination of the above items, or through another means. In addition to the text and graphics information illustrated in FIG. 6, audio or video information may constitute or accompany an application under evaluation 230 output and could further identify relationships and/or constraints on the fields and information. Understanding these relationships may be important to the automatic and intelligent search, navigation, exercise, and testing of applications under evaluation 230. In order to navigate beyond an input page, it may be necessary for an automatic system (e.g. system 100) to enter valid inputs. Effective navigation may require that constraints on field entries and order of operations be fully understood by the system 100. Additionally, understanding the relationships and groupings between name, first, middle, last, and nickname fields and labels may be critical to search, exercise, and test activities, which desire to inspect or test these relationships. Effective search, navigation, exercise and testing may require that descriptive information such as constraints be properly differentiated from labels and handled according to the needs of the application under evaluation 230. While currently existing systems may be capable of creating some relationships or using image analysis techniques based upon simple distance measures and segmentation of horizontal and vertical separators, such systems do not provide for the intelligent, complete, efficient and robust development of these relationships, as with the disclosed with system 100 and/or method 900.

Figure 7:
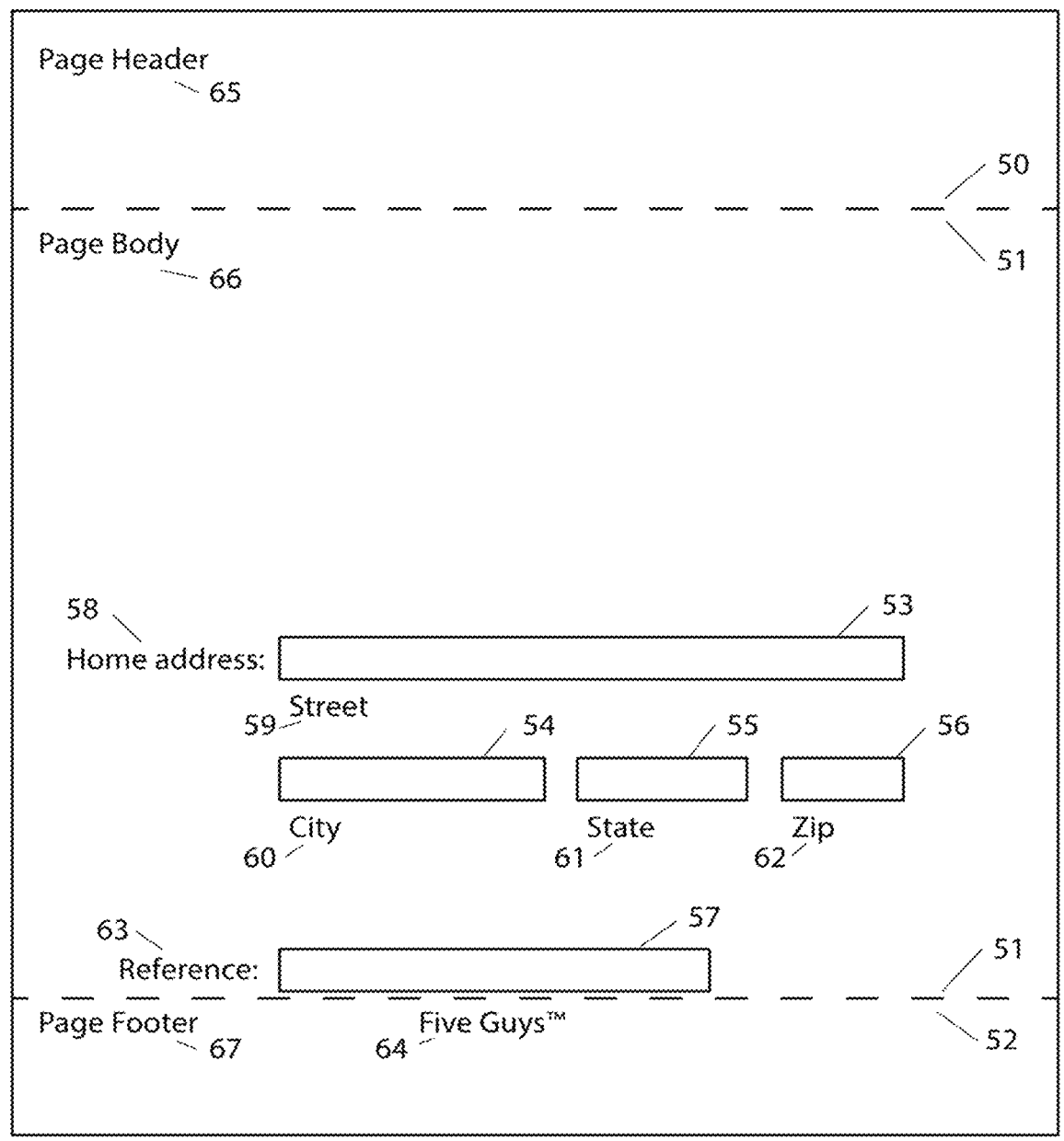
FIG. 7 is an example of a computer program input form associated with an application under evaluation that may be analyzed by utilizing cross-type reasoning functionality provided by the system of FIG. 1.

In a third use-case scenario and referring now also to FIG. 7, an example of cross-type reasoning conducted by the system 100 and/or method 900 is provided. This use-case shows that a cross-type reasoner 27 may utilize features extracted from images, natural language processed text, domains, and/or structural information to establish correct hypotheses and reject false hypotheses that may result for any single-type of reasoner 22. Typically, web pages (e.g. web page 700 including a form) are structurally divided into header 65, body 66, and footer 67 sections although the division of these sections may lack visual dividers 50, 51, 52, and, thus, may not be apparent in the rendered image of the web page 700. In this use case, the footer 67 does not have any separators (a line) or background changes, which would distinguish it from the body 66. In this case, a geometry (rendered image) based feature extractor (e.g. geometric feature extractor 19) and reasoner (e.g. geometric reasoner 24) might incorrectly associate the name of the company, Five Guys™ 64 in this example, with the field directly above the name as this is a similar association that the labels, "City" 60, "State" 61, "Zip" 62, and "Street" 59 have with the fields 53-56 above them. In this use-case scenario, a cross-type reasoner 27 may utilize the output of the structural feature extractor 18 in combination with the output of the geometric feature extractor 19 to exclude the Five Guys association because the field 57 and label 64 are not in the same structural feature (header/body/footer). This negative inference may not be achievable through the use of structural and geometric reasoners separately.

The systems and methods disclosed herein may include further functionality and features. For example, the operative functions of the system 100 and method 900 may be configured to execute on a special-purpose processor specifically configured to carry out the operations provided by the system 100 and method 900. Notably, the operative features and functionality provided by the system 100 and method 900 may increase the efficiency of computing devices that are being utilized to facilitate the functionality provided by the system 100 and method 900. For example, the system 100 and method 900 can optimize the performance of future actions through machine learning, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. In certain embodiments, the system 100 may learn that certain state(s) associated with and/or from discovery and/or testing may be faster on certain processing hardware. For example, for a state with complex mathematical operations and/or graphics, the system 100 may perform better when there is a floating point processor or a graphics processing unit. As another example, when compared to existing solutions, the discovery of concepts, relationships, and/or groupings associated with data elements in source inputs as performed by the system 100 reduces computing costs, as measured by central processing unit (CPU) cycles, memory usage, and network bandwidth. In certain embodiments, the system 100 accomplishes such reductions in computing costs by learning over time which features lead to more optimal concept relationship, and/or grouping determinations, learning which feature extractors 17 and/or reasoners 22 result in higher quality determinations and/or hypotheses; learning which hypotheses and/or tests are more efficient and/or superior to other hypotheses and/or tests, learning which sources of knowledge and information produce higher confidence determinations and/or hypotheses with regard to an application under evaluation 230, any other learning, or any combination thereof. As a result, the functionality provided by the system 100 and method 900 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100 and/or the application under evaluation 230. In certain embodiments, the system 100 and methods may also provide effective computing resource management by utilizing the features and functions described in the present disclosure. For example, in certain embodiments, the system 100 may specify a quantity of computer processor resources (e.g. processor clock cycles, processor speed, processor cache, etc.) that may be dedicated to parsing text extracted from outputs of the application under evaluation 230; parsing text extracted from hierarchical and/or graphical models of applications (e.g. application under evaluation 230); parsing text extracted from internal and/or external sources 201, 202; extracting features from information included in inputs to the system 100; determining concepts, relationships, and/or groupings for data elements in the inputs; generating hypotheses associated with the concepts, relationships, and/or groupings; ranking and/or filtering the hypotheses based on comparisons to threshold confidence levels; conducting hypothesis testing to validate the hypotheses; generating feedback based on test results from the hypothesis testing; updating confidence levels for hypotheses, tests, sources of information, and/or other features of the system 100; adjusting parameters, vocabularies, dictionaries, and/or other features of the system 100 to improve feature extraction, reasoning, and/or generation of hypotheses during subsequent discovery processes; and performing any other operations conducted by the system 100, or any combination thereof. As another example, the system 100 may indicate a quantity of processor cycles of a processor that may be utilized to obtain data, process obtained data, and/or specify a selected amount of processing power that may be dedicated to evaluating the application under evaluation 230 or conducting the static and dynamic model discovery.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and method 900 at time periods when usage of processing resources and/or memory resources in the system 100 is at a selected and/or threshold value. In certain embodiments, the threshold may be a price or cost of using a resource (e.g. CPU, RAM, Network, virtual machine, etc.) in a cloud environment. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. For example, a signal may be transmitted to the memory devices indicating which portions of the memories should be dedicated to analyzing information provided by a source of information, extracting features from the information, determining concepts, relationships, and groupings for data elements in the information by utilizing the reasoners, conducting hypothesis testing, analyzing test results of the hypothesis testing, analyzing graphical and/or hierarchical models of various applications (e.g. application under evaluation 230), utilizing natural language processing techniques to parse and extract meaning from text, generating hypotheses, generating tests for hypotheses and/or suggested constraints, processing feedback generated based on the tests results, ranking hypotheses, validating the hypotheses through conducting hypothesis testing, adjusting parameters, models, vocabularies, dictionaries, and other features of the system 100 to improve feature extraction, reasoning and/or generation of hypotheses, providing updates for the agglomerated models 208, any other information stored by the system 100, or a combination thereof. Notably, the signals transmitted to the processors and memories may be utilized to optimize the usage of computing resources while executing the operations conducted by the system 100. As a result, such features provide substantial operational efficiencies and improvements over existing technologies.

Figure 10:
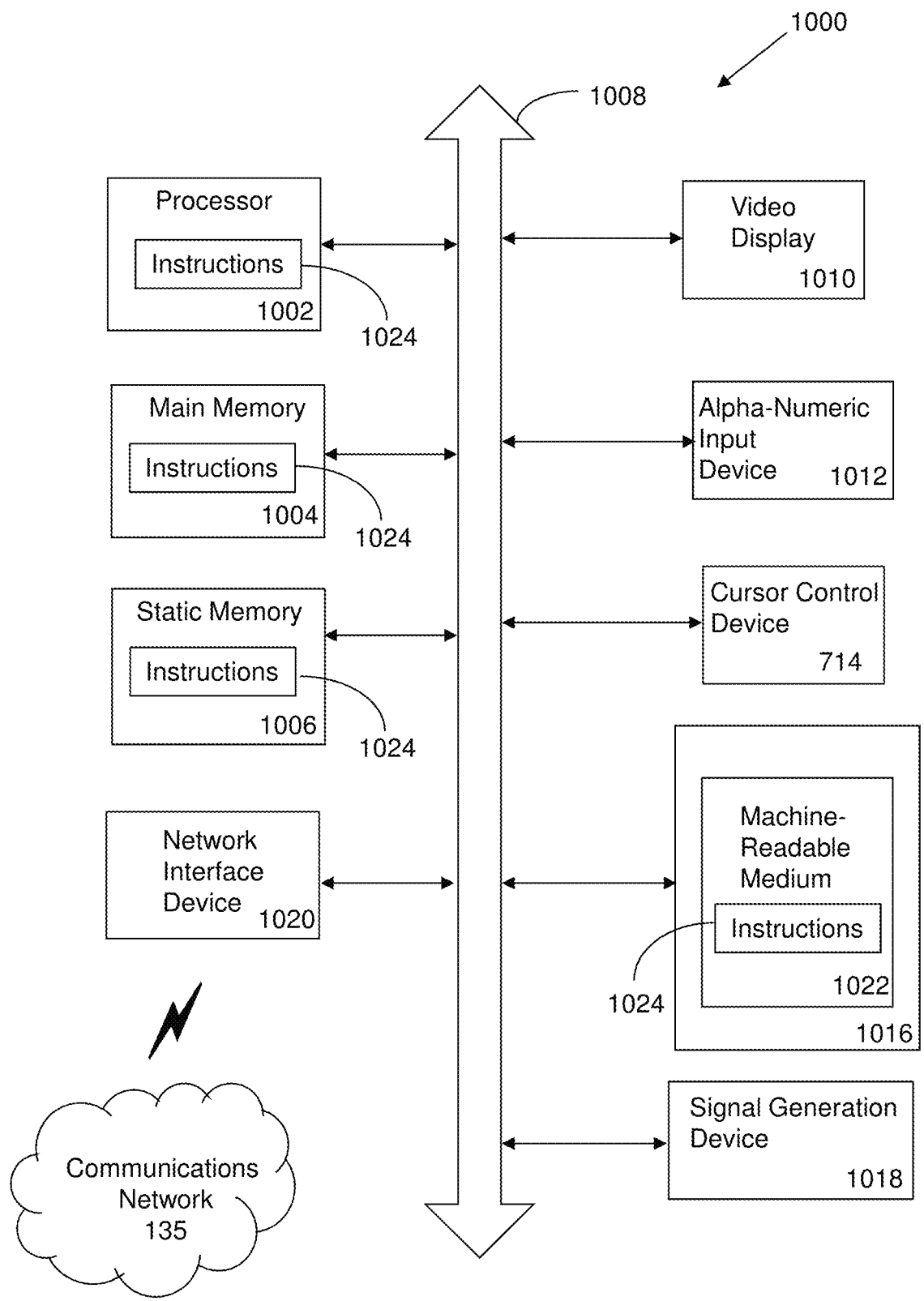
FIG. 10 is a schematic diagram of a machine in the form of a computer system within which a set of instructions, when executed, may cause the machine to perform any one or more of the methodologies or operations of the systems and methods for discovering semantic relationships in computer programs.

Referring now also to FIG. 10, at least a portion of the methodologies and techniques described with respect to the exemplary embodiments of the system 100 can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the feature extractors 17, the reasoners 22, the external labeler 34, the first user device 102, the second user device 111, the server 140, the natural language processing engine 143, the part of speech tagger 144, the server 150, the knowledge engine 153, the hypothesis tester 154, the constraint solver 156, the database 155, the hypothesis resolver 157, server 160, the reasoning engine 170, any other component of the system 100, or any combination thereof. The machine may assist with operations performed by the static model discovery module 200, the model change management module 204, the dynamic module discovery module 206, the controller 224, the learning engine 226, evaluators 220, the application under evaluation 230, the data transformers 232, any other component in the system, any programs in the system, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 135, another network, or a combination thereof, can send or receive voice, video or data, and communicate over the communications network 135, another network, or a combination thereof, using the instructions. The instructions 1024 may further be transmitted or received over the communications network 135, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A method comprising:
    analyzing, for a semantic relationship discovery process, information provided by a source, wherein the information is associated with an application under evaluation by a system and is actively extracted from interactions conducted with the application under evaluation while the application under evaluation is under evaluation by the system;
    determining, based on the analyzing of the information provided by the source, a concept associated with data elements in the information, a relationship between the data elements in the information, a grouping associated with the data elements in the information, or a combination thereof;
    generating, based on the analyzing of the information, a constraint suggestion for the application under evaluation;
    generating, based on the constraint suggestion and by utilizing instructions from a memory that are executed by a processor of the system, a hypothesis associated with the concept, the relationship, the grouping, or a combination thereof, wherein the hypothesis is ranked relative to other hypotheses generated by the system based on a confidence level of the hypothesis and confidence levels of the other hypotheses to form a ranked plurality of hypotheses;
    filtering, by applying a confidence level threshold to the ranked plurality of hypotheses, a subset of hypotheses from the ranked plurality of hypotheses that satisfy the confidence level threshold;
    outputting the subset of hypotheses satisfying the confidence level threshold:
    validating the hypothesis, the other hypotheses, the subset of hypotheses, or a combination thereof, by testing the application under evaluation and observing outputs generated based on the testing; and
    training, based on the validating of the hypothesis, the other hypotheses, the subset of hypotheses, or a combination thereof, and based on a confirmation or a rejection of the hypothesis, the other hypotheses, the subset of hypotheses, or a combination thereof, a model to enhance the determination of the concept, the relationship, the grouping, or a combination thereof, for a subsequent semantic relationship discovery process.

2. The method of claim 1, further comprising adjusting a vocabulary, a dictionary, a parameter, a model, a confidence, or a combination thereof, utilized in determining the concept, the relationship, the grouping, or a combination thereof, based on the validating of the hypothesis, the other hypotheses, the subset of hypotheses, or a combination thereof.

3. The method of claim 1, further comprising outputting the concept, the relationship, the grouping, or a combination thereof, if the concept, the relationship, the grouping, or a combination thereof, have confidence levels exceeding a selected threshold confidence level.

4. The method of claim 1, further comprising training a reasoner utilizing to determine the concept, the relationship, the grouping, or a combination thereof, based on the outputs generated based on the testing.

5. The method of claim 1, further comprising accepting an input from a user, a device, a program, or a combination thereof, that confirms or rejects the hypothesis, the other hypotheses, the subset of hypotheses, or a combination thereof.

6. The method of claim 1, further comprising utilizing a cross-domain reasoner to determine the concept, the relationship, the grouping, or a combination thereof, from two or more component reasoners.

7. The method of claim 1, wherein the confidence level of the hypothesis is based on a type of the hypothesis, content of the hypothesis, a complexity of the hypothesis, a source of the hypothesis, or a combination thereof.

8. The method of claim 1, further comprising labeling features extracted from the information provided by the source and outputs associated with the features.

9. A system comprising:
a memory that stores instructions; and
a processor that executes the instructions to perform operations, the operations comprising:
analyzing, for a semantic relationship discovery process, information provided by a source, wherein the information is associated with an application under evaluation by the system and is actively extracted from interactions conducted with the application under evaluation while the application under evaluation is under evaluation by the system;
determining, based on the analyzing of the information provided by the source, a concept associated with data elements in the information, a relationship between the data elements in the information, a grouping associated with the data elements in the information, or a combination thereof;
generating, based on the analyzing of the information, a constraint suggestion for the application under evaluation;
generating, based on the constraint suggestion, a hypothesis associated with the concept, the relationship, the grouping, or a combination thereof;
ranking the hypothesis relative to other hypotheses generated by the system based on a confidence level of the hypothesis and confidence levels of the other hypotheses to form a ranked plurality of hypotheses;
filtering, by applying a confidence level threshold to the hypothesis, a subset of hypotheses from the ranked plurality of hypotheses that satisfy the confidence level threshold;
outputting the subset of hypotheses satisfying the confidence level threshold; and
testing the subset of hypotheses against the application under evaluation to confirm or reject the subset of hypotheses; and
training, based on the testing of the subset of hypotheses and based on a confirmation or a rejection of the subset of hypotheses, a model to enhance the determination of the concept, the relationship, the grouping, or a combination thereof, for a subsequent semantic relationship discovery process.

10. The system of claim 9, wherein the operations further comprise testing the subset of hypotheses against a different application under evaluation.

11. The system of claim 10, wherein the operations further comprise training the model based on the testing of the subset of hypotheses against the different application under evaluation.

12. The system of claim 9, wherein the operations further comprise validating the hypothesis, the other hypotheses, or a combination thereof, by testing, based on the hypothesis, the other hypotheses, or a combination thereof, the concept associated with the data elements, the relationship between the data elements, the grouping associated with the data elements, or a combination thereof, with the application under evaluation, and wherein the operations further comprise observing an output of the application under evaluation generated in response to the testing in order to validate the hypothesis, the other hypotheses, the subset of hypotheses, or a combination thereof.

13. The system of claim 9, wherein the operations further comprise extracting a structural feature of an organizational structure of a document included in the information that is associated with the application under evaluation, and wherein the operations further comprise determining the concept associated with the data elements in the information, the relationship between the data elements in the information, the grouping associated with the data elements in the information, or a combination thereof, based on the structural feature of the document.

14. The system of claim 9, wherein the operations further comprise extracting a geometric feature from a rendering of the information associated with the application under evaluation, and wherein the operations further comprise determining the concept associated with the data elements in the information, the relationship between the data elements in the information, the grouping associated with the data elements in the information, or a combination thereof, based on the geometric feature.

15. The system of claim 9, wherein the operations further comprise extracting a natural language processing feature from text extracted from the information associated with the application under evaluation, and wherein the operations further comprise determining the concept associated with the data elements in the information, the relationship between the data elements in the information, the grouping associated with the data elements in the information, or a combination thereof, based on the natural language processing feature.

16. The system of claim 9, wherein the operations further comprise extracting a domain feature from a domain or an area associated with the source of the information associated with the application under evaluation, and wherein the operations further comprise determining the concept associated with the data elements in the information, the relationship between the data elements in the information, the grouping associated with the data elements in the information, or a combination thereof, based on the domain feature.

17. The system of claim 9, wherein the operations further comprise determining the concept associated with the data elements in the information, the relationship between the data elements in the information, the grouping associated with the data elements in the information, or a combination thereof, by utilizing a cross-type reasoner that processes features extracted from the information associated with the application under evaluation by two or more feature extractors.

18. The system of claim 9, wherein the operations further comprise testing other hypotheses against the application under evaluation, and wherein the operations further comprise confirming or rejecting the hypothesis, the other hypotheses, the subset of hypotheses, or a combination thereof, based on outputs generated based on the testing performed against the application under evaluation.

19. The system of claim 18, wherein the operations further comprise providing the outputs indicating a confirmation or a rejection of the hypothesis, the other hypotheses, the subset of hypotheses, or a combination thereof, to a learning engine for processing, and wherein the operations further comprise training or improving a model, parameter, weight, a dictionary, a threshold, a confidence, a feature extractor, a reasoner, or a filter associated with generating a future hypothesis, wherein the training or the improving is based on the confirmation or the rejection of the hypothesis, the subset of hypotheses, or a combination thereof.

20. The system of claim 9, wherein the operations further comprise processing, by utilizing an agglomerated model, the information to extract a feature for processing by a reasoner of the system.

21. The system of claim 9, wherein the operations further comprise excluding a feature from being extracted from the information for subsequent concept, relationship, and grouping determinations if the feature does not correlate with a validated result obtained from testing the hypothesis, other hypotheses, the subset of hypotheses, or a combination thereof.

22. The system of claim 9, wherein the operations further comprise excluding features from being extracted from the information for subsequent concept, relationship, and grouping determinations if the features indicate a collinear relationship, if the features indicate a lack of independent discriminatory effect, or a combination thereof.

23. A non-transitory computer-readable device comprising instructions, which when loaded and executed by a processor, cause the processor to perform operations comprising:
- analyzing, for a semantic relationship discovery process, information provided by a source, wherein the information is associated with an application under evaluation by a system and is actively extracted from interactions conducted with the application under evaluation while the application under evaluation is under evaluation by the system;
- determining, based on the analyzing of the information provided by the source, a concept associated with data elements in the information, a relationship between the data elements in the information, a grouping associated with the data elements in the information, or a combination thereof;
- determining, based on the analyzing of the information, a constraint suggestion for the application under evaluation;
- generating, based on the constraint suggestion, a hypothesis associated with the concept, the relationship, the grouping, or a combination thereof, wherein the hypothesis is ranked relative to other hypotheses generated by the system based on a confidence level of the hypothesis and confidence levels of the other hypotheses to form a ranked plurality of hypotheses;
- filtering, by applying a confidence level threshold to the ranked plurality of hypotheses, a subset of hypotheses from the ranked plurality of hypotheses satisfying the confidence level threshold;
- utilizing the subset of hypotheses filtered from the ranked plurality of hypothesis when testing the application under evaluation;
- testing the hypothesis against the application under evaluation to confirm or reject the hypothesis; and
- training, based on the testing of the hypothesis and based on a confirmation or a rejection of the hypothesis, a model to enhance the determination of the concept, the relationship, the grouping, or a combination thereof, for a subsequent semantic relationship discovery process.

24. The non-transitory computer-readable device of claim 23, wherein the operations further comprise providing an output generated based on the testing to a learning engine for processing, wherein the learning engine determines, based on the output, a pattern or confidence associated with the hypothesis, the subset of hypotheses, the other hypotheses, or a combination thereof, to adjust generation of a future hypothesis, adjust the confidence level, adjust the confidence levels of the other hypotheses, or a combination thereof, over time.

\* \* \* \* \*